United States Patent
Arunachalam

(12) 
(10) Patent No.: US 6,212,556 B1
(45) Date of Patent: *Apr. 3, 2001

(54) CONFIGURABLE VALUE-ADDED NETWORK (VAN) SWITCHING

(75) Inventor: Lakshmi Arunachalam, Menlo Park, CA (US)

(73) Assignee: WebXchange, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/296,207

(22) Filed: Apr. 21, 1999

Related U.S. Application Data

(60) Continuation-in-part of application No. 08/879,958, filed on Jun. 20, 1999, now Pat. No. 5,987,500, which is a division of application No. 08/700,726, filed on Aug. 5, 1996, now Pat. No. 5,778,178.
(60) Provisional application No. 60/006,634, filed on Nov. 13, 1995.

(51) Int. Cl.[7] ....................................... G06F 13/00
(52) U.S. Cl. .................. 709/219; 709/223; 709/225; 709/227
(58) Field of Search .................................... 709/202, 203, 709/217, 218, 219, 223, 224, 225, 227, 230, 238, 250, 313, 328, 329

(56) References Cited

U.S. PATENT DOCUMENTS

| | | | |
|---|---|---|---|
| 5,148,474 | * 9/1992 | Haralambopoulos et al. | 379/111 |
| 5,537,464 | * 7/1996 | Lewis et al. | 379/114 |
| 5,557,780 | * 9/1996 | Edwards et al. | 395/500.48 |
| 5,828,666 | * 10/1998 | Focsaneanu et al. | 370/389 |
| 5,892,821 | * 4/1999 | Turner | 379/220 |

OTHER PUBLICATIONS

Davidson, Andrew, Coding with HTML forms: HTML goes interactive. (hpertext markup language) (Tutorial); Dr. Dobb's Journal; vol. 20, No. 6, Jun. 1995; 19 pages.

* cited by examiner

*Primary Examiner*—Viet D. Vu
(74) *Attorney, Agent, or Firm*—Blakely, Sokoloff, Taylor & Zafman, LLP

(57) ABSTRACT

The present invention provides a method and apparatus for providing real-time, two-way transactional capabilities on the network. Specifically, one embodiment of the present invention discloses a configurable value-added network switch for enabling real-time transactions on the network. The configurable value added network switch comprises means for switching to a transactional application in response to a user specification from a network application, means for transmitting a transaction request from the transactional application, and means for processing the transaction request. Additionally, a method for enabling object routing is disclosed, comprising the steps of creating a virtual information store containing information entries and attributes associating each of the information entries and the attributes with an object identity, and assigning a unique network address to each of the object identities. Finally, a method is disclosed for enabling service management of the value-added network service, to perform OAM&P functions on the services network.

30 Claims, 29 Drawing Sheets

```
BEGINCLASS COREBUSINESSOBJECT
BEGINDATA
ENDDATA

BEGINMETHOD
INCLUDE HSKEL
PRIVATE:
# USED BY THE FINITE STATE MACHINE
VIRTUAL VOID FSM_INIT() { }
VOID FSM_ACTION_TIMEOUT(CONST CHAR* TIMEVAL);
VOID FSM_ACTION_THROW(CONST CHAR* MESSAGE);
VOID FSM_ACTION_RETURN(CONST CHAR* RESULT);
VOID FSM_ACTION_SEND(CONST CHAR* VALUE);
PUBLIC:
ENDINCLUDE

# TO CONIFIGURE THE FSM
METHOD      VOID   FSM_LOAD_DOLSIB {STRING FILENAME}
# TO TRIGGER AN EVENT IN THE FSM
METHOD      VOID   FSM_EVENT    {STRING NAME} {STRING VALUE}
METHOD      STRING FSM_RESULT
# TO SET/GET VARIABLES FROM FSM
METHOD      VOID FSM_SET_STRING {STRING NAME} {STRING VALUE}
METHOD CONST STRING FSM_GET_STRING {STRING  NAME}
METHOD      VOID   FSM_SET_INTEGER {STRING NAME} {INT VALUE}
METHOD CONST INT   FSM_GET_INTEGER {STRING NAME}
ENDMETHOD

ENDCLASS
```

FIG. 19

CONFIGURABLE VALUE-ADDED NETWORK (VAN) SWITCHING

RELATED APPLICATIONS

This application is a continuation-in-part patent application claiming priority to U.S. Pat. No. 5,987,500, entitled Value-Added Network System For Enabling Real-Time, Bi-Directional Transactions On A Network, formerly application Ser. No. 08/879,958, and filed on Jun. 20, 1997; which is a divisional application of U.S. Pat. No. 5,778,178, entitled Method And Apparatus For Enabling Real-Time Bi-Directional Transactions On A Network, formerly application Ser. No. 08/700,726, and filed on Aug. 5, 1996. This application also claims benefit under 35 U.S.C. 119(e) to U.S. Provisional application Ser. No. 60/006,634 filed Nov. 13, 1995.

FIELD OF THE INVENTION

The present invention relates to the area of network communications, including heterogeneous networks such as the Internet, World Wide Web (WWW), telephone network, wireless networks, cable television networks, and private enterprise networks. Specifically, the present invention relates to a method and apparatus for configurable value-added network switching and object routing.

BACKGROUND OF THE INVENTION

With the Internet and the World Wide Web ("the Web") evolving rapidly as a viable consumer medium for electronic commerce, new on-line services are emerging to fill the needs of on-line users. An Internet user today can browse on the Web via the use of a Web browser. Web browsers are software interfaces that run on Web clients to allow access to Web servers via a simple user interface. A Web user's capabilities today from a Web browser are, however, extremely limited. The user can perform one-way, browse-only interactions. Additionally, the user has limited "deferred" transactional capabilities, namely electronic mail (e-mail) capabilities. E-mail capabilities are referred to as "deferred transactions" because the consumer's request is not processed until the e-mail is received, read, and the person or system reading the e-mail executes the transaction. This transaction is thus not performed in real-time.

FIG. 1A illustrates typical user interactions on the Web today. User 100 sends out a request from Web browser 102 in the form of a universal resource locator (URL) 101 in the following manner: http://www.car.com. URL 101 is processed by Web browser 102 that determines the URL corresponds to car dealer Web page 105, on car dealer Web server 104. Web browser 102 then establishes browse link 103 to car dealer Web page 105. User 100 can browse Web page 105 and select "hot links" to jump to other locations in Web page 105, or to move to other Web pages on the Web. This interaction is typically a browse-only interaction. Under limited circumstances, the user may be able to fill out a form on car dealer Web page 105, and e-mail the form to car dealer Web server 104. This interaction is still strictly a one-way browse mode communications link, with the e-mail providing limited, deferred transactional capabilities.

Under limited circumstances, a user may have access to two-way services on the Web via Common Gateway Interface (CGI) applications. CGI is a standard interface for running external programs on a Web server. It allows Web servers to create documents dynamically when the server receives a request from the Web browser. When the Web server receives a request for a document, the Web server dynamically executes the appropriate CGI script and transmits the output of the execution back to the requesting Web browser. This interaction can thus be termed a "two-way" transaction. It is a severely limited transaction, however, because each CGI application is customized for a particular type of application or service.

For example, as illustrated in FIG. 1B, user 100 may access bank 150's Web server and attempt to perform transactions on checking account 152 and to make a payment on loan account 154. In order for user 100 to access checking account 152 and loan account 154 on the Web, CGI application scripts must be created for each account, as illustrated in FIG. 1B. The bank thus has to create individual scripts for each of its services to offer users access to these services. User 100 can then interact in a limited fashion with these individual applications. Creating and managing individual CGI scripts for each service is not a viable solution for merchants with a large number of services.

As the Web expands and electronic commerce becomes more desirable, the need increases for robust, real-time, bidirectional transactional capabilities on the Web. A true real-time, bidirectional transaction would allow a user to connect to a variety of services on the Web, and perform real-time transactions on those services. For example, although user 100 can browse car dealer Web page 105 today, the user cannot purchase the car, negotiate a car loan or perform other types of real-time, two-way transactions that he can perform with a live salesperson at the car dealership. Ideally, user 100 in FIG. 1A would be able to access car dealer Web page 105, select specific transactions that he desires to perform, such as purchase a car, and perform the purchase in real-time, with two-way interaction capabilities. CGI applications provide user 100 with a limited ability for two-way interaction with car dealer Web page 105, but due to the lack of interaction and management between the car dealer and the bank, he will not be able to obtain a loan and complete the purchase of the car via a CGI application. The ability to complete robust real-time, two-way transactions is thus not truly available on the web today.

SUMMARY OF THE INVENTION

It is therefore an object of the present invention to provide a method and apparatus for providing real-time, two-way transactional capabilities on the network, including heterogeneous networks such as the Internet, World Wide Web (WWW), telephone network, wireless networks, cable television networks, and private enterprise networks. Specifically, one embodiment of the present invention discloses a configurable value-added network switch for enabling real-time transactions on a network. The configurable value added network switch comprises means for switching to a transactional application in response to a user specification from a network application, means for transmitting a transaction request from the transactional application, and means for processing the transaction request.

According to another aspect of the present invention, a method and apparatus for enabling object routing on a network is disclosed. The method for enabling object routing comprises the steps of creating a virtual information store containing information entries and attributes, associating each of the information entries and the attributes with an object identity, and assigning a unique network address to each of the object identities.

Other objects, features and advantages of the present invention will be apparent from the accompanying drawings and from the detailed description.

BRIEF DESCRIPTION OF THE DRAWINGS

The features and advantages of the present invention will be apparent from the accompanying drawings and from the detailed description of the present invention as set forth below.

FIG. 19 illustrates a CoreBusinessObject Object Router description.

DETAILED DESCRIPTION OF THE PREFERRED EMBODIMENT

The present invention relates to a method and apparatus for configurable value-added network switching and object routing and management. The network browser or "Web browser" as used in the context of the present specification includes conventional Web browsers such as NCSA Mosaic™ from NCSA and Netscape Mosaic™ from Netscape™. The present invention is independent of the Network browser being utilized and the user can use any Network browser, without modifications to the Network browser. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1A:
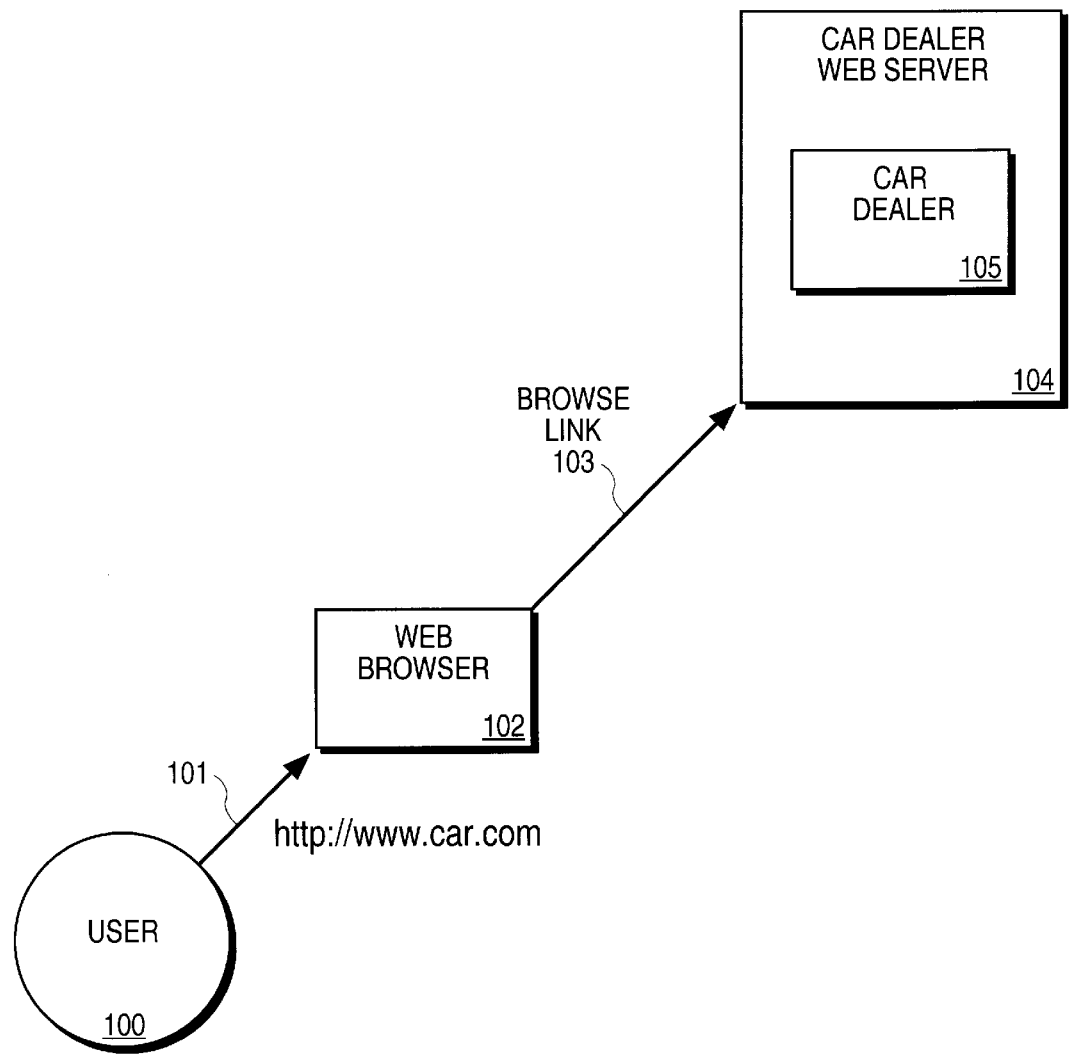
FIG. 1A is an illustration of a current user's browse capabilities on a network via a network browser.
Figure 1B:
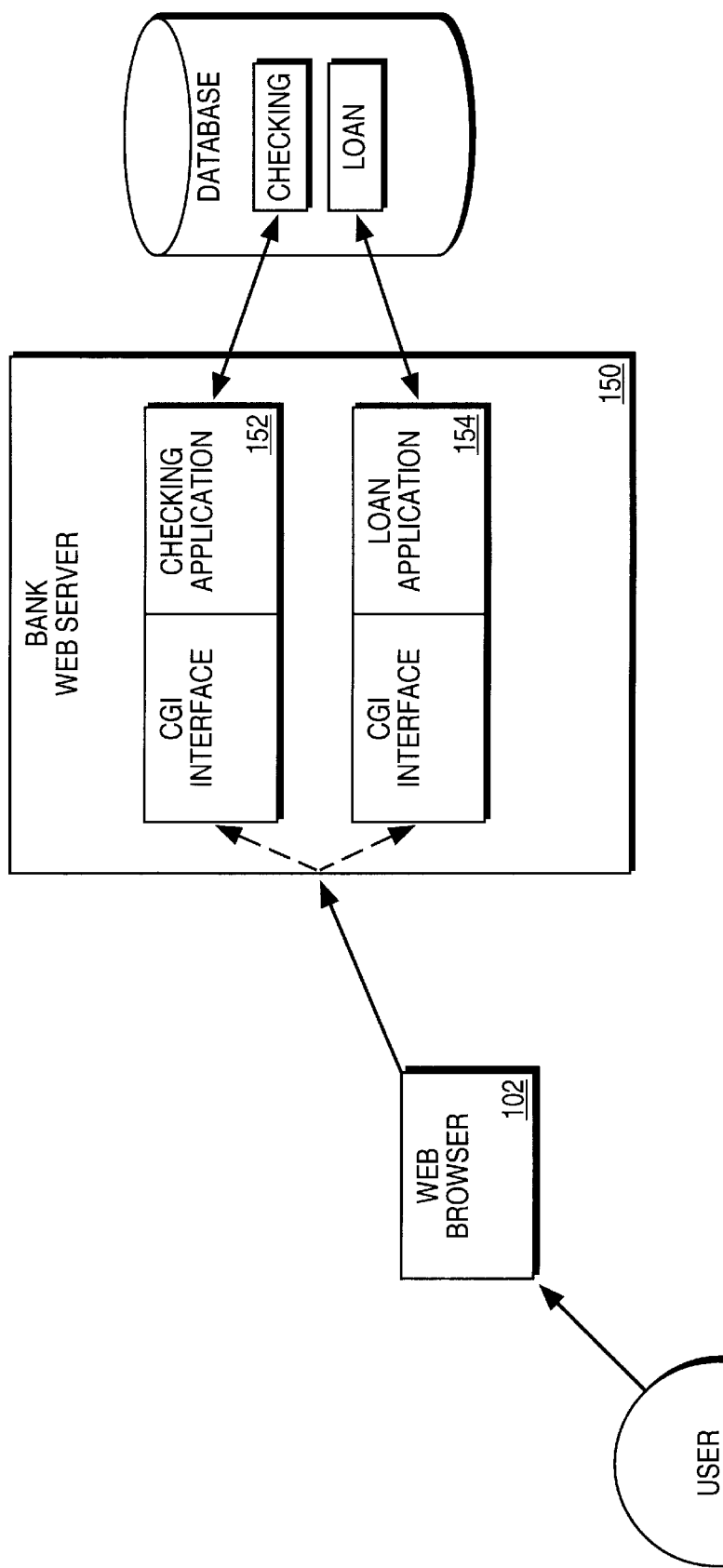
FIG. 1B is an illustration of a current user's capabilities to perform limited transactions on the Network via CGI applications.
Figure 2:
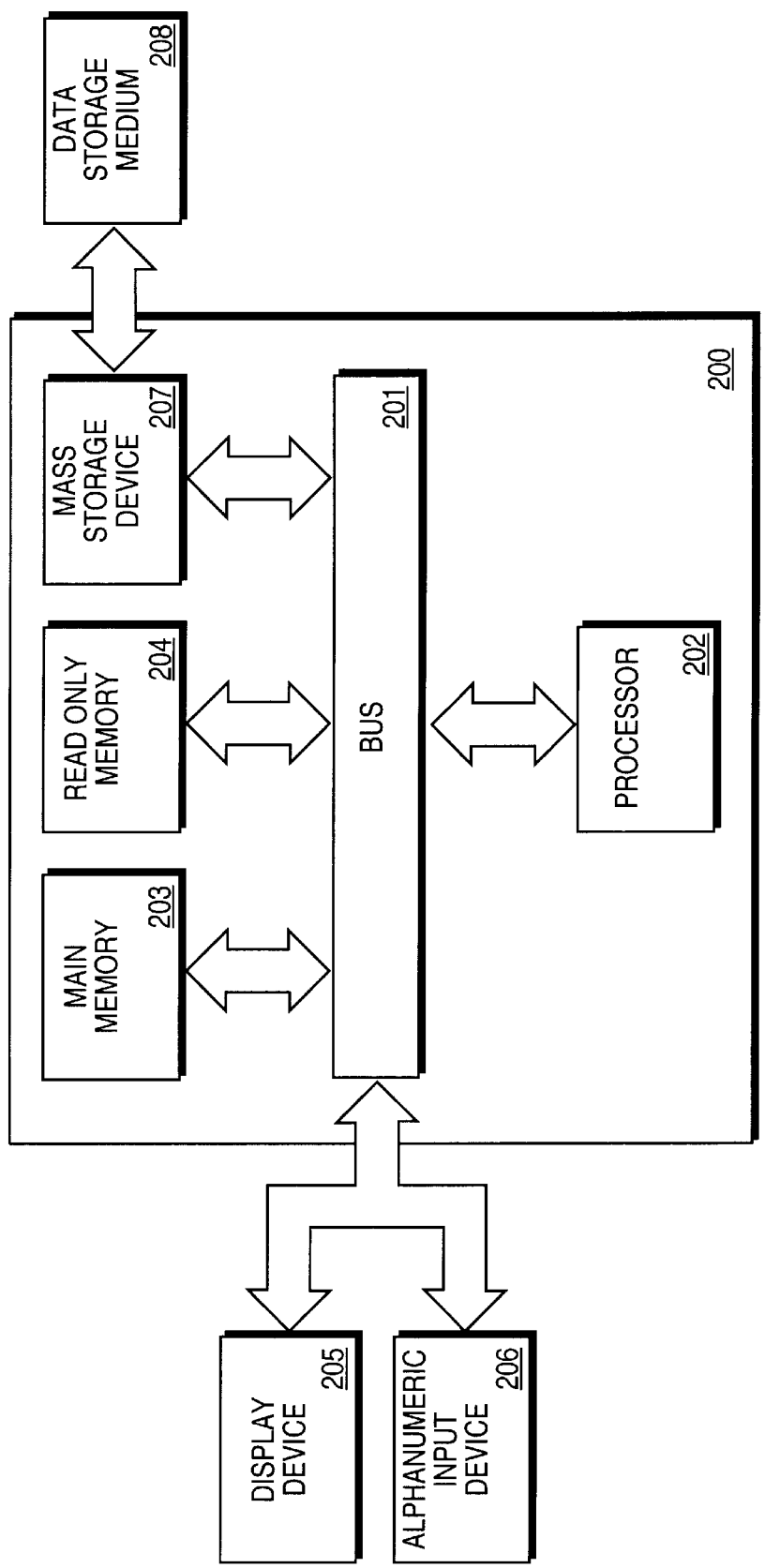
FIG. 2 illustrates a typical computer system on which the present invention may be: utilized.

FIG. 2 illustrates a typical computer system 200 in which the present invention operates. The preferred embodiment of the present invention is implemented on an IBM™ Personal Computer manufactured by IBM Corporation of Armonk, N.Y. Alternate embodiments may be implemented on a Macintosh™ computer manufactured by Apple™ Computer, Incorporated of Cupertino, Calif. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium™ microprocessor manufactured by Intel™ Corporation or the Motorola™ 68040 or Power PC™ brand microprocessor manufactured by manufactured by Motorola™ Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

The preferred embodiment of the present invention is implemented as a software module, which may be executed on a computer system such as computer system 200 in a conventional manner. Using well known techniques, the application software of the preferred embodiment is stored on data storage medium 208 and subsequently loaded into and executed within computer system 200. Once initiated, the software of the preferred embodiment operates in the manner described below.

Figure 3:
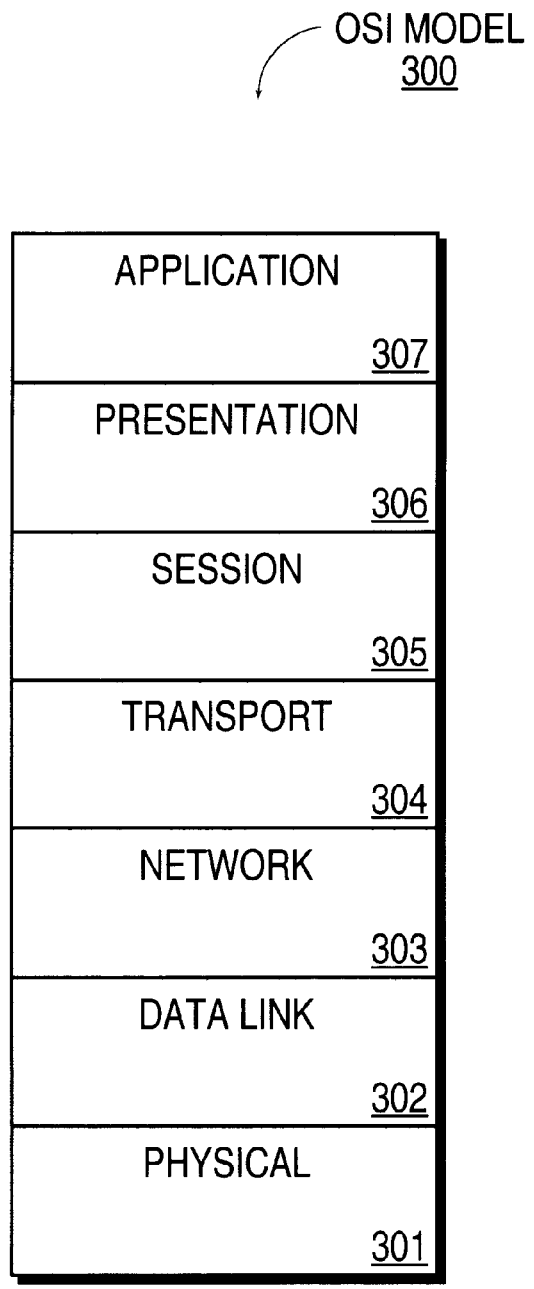
FIG. 3 illustrates the Open Systems Interconnection (OSI) Model.

FIG. 3 illustrates the Open Systems Interconnection (OSI) reference model. OSI Model 300 is an international standard that provides a common basis for the coordination of standards development, for the purpose of systems interconnection. The present invention is implemented to function as a routing switch within the "application layer" of the OSI model. The model defines seven layers, with each layer communicating with its peer layer in another node through the use of a protocol. Physical layer 301 is the lowest layer, with responsibility to transmit unstructured bits across a link. Data link layer 302 is the next layer above physical layer 301. Data link layer 302 transmits chunks across the link and deals with problems like checksumming to detect data corruption, orderly coordination of the use of shared media and addressing when multiple systems are reachable. Network bridges operate within data link layer 302.

Network layer 303 enables any pair of systems in the network to communicate with each other. Network layer 303 contains hardware units such as routers, that handle routing, packet fragmentation and reassembly of packets. Transport layer 304 establishes a reliable communication stream between a pair of systems, dealing with errors such as lost packets, duplicate packets, packet reordering and fragmentation. Session layer 305 offers services above the simple communication stream provided by transport layer 304. These services include dialog control and chaining. Presentation layer 306 provides a means by which OSI compliant applications can agree on representations for data Finally, application layer 307 includes services such as file transfer, access and management services (FTAM), electronic mail and virtual terminal (VT) services. Application layer 307 provides a means for application programs to access the OSI environment. As described above, the present invention is implemented to function as a routing switch in application layer 307. Application layer routing creates an open channel for the management, and the selective flow of data from remote databases on a network.

A. Overview

Figure 4A:
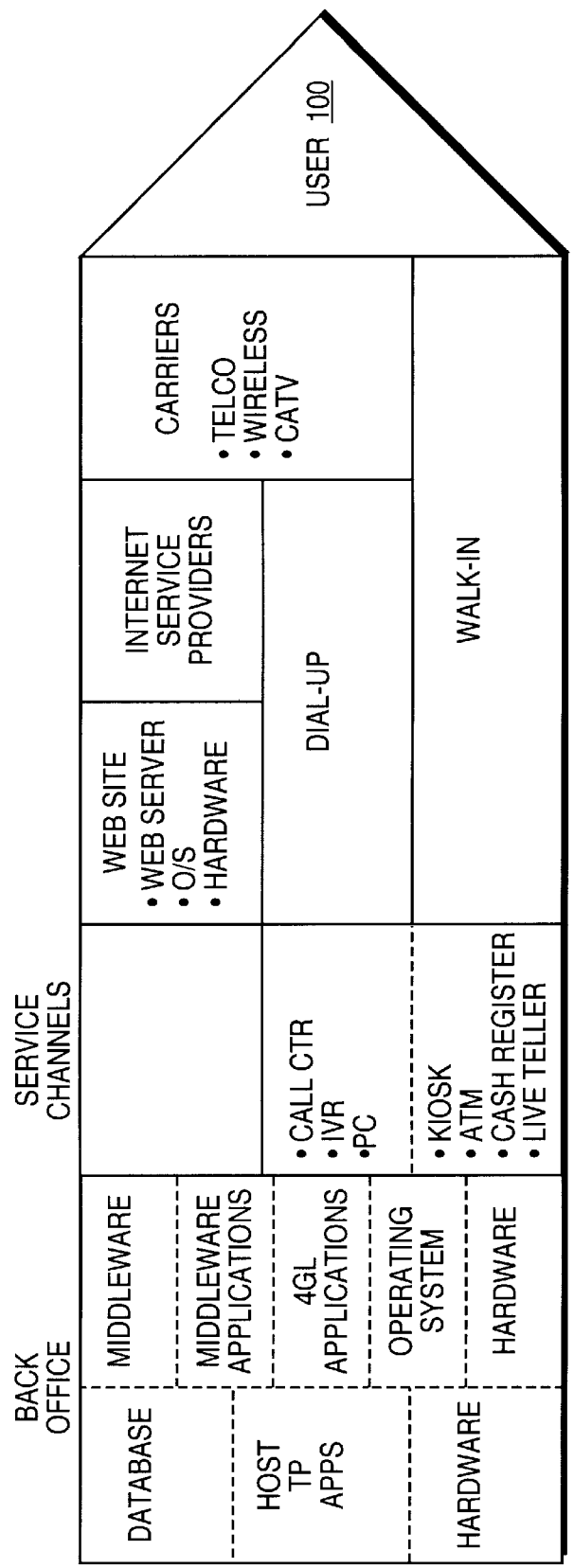
FIG. 4A illustrates conceptually the user value chain as it exists today.

FIG. 4A illustrates conceptually the user value chain as it exists today. The user value chain in FIG. 4A depicts the types of transactions that are performed today, and the channels through which the transactions are performed. A "transaction" for the purposes of the present invention includes any type of commercial or other type of interaction that a user may want to perform. Examples of transactions include a deposit into a bank account, a request for a loan from a bank, a purchase of a car from a car dealership or a purchase of a car with financing from a bank. A large variety of other transactions are also possible.

A typical user transaction today may involve user 100 walking into a bank or driving up to a teller machine, and interacting with a live bank teller, or automated teller machine (ATM) software applications. Alternatively, user 100 can perform the same transaction by using a personal computer (PC), activating application software on his PC to access his bank account, and dialing into the bank via a modem line. If user 100 is a Network user, however, there is no current mechanism for performing a robust, real-time transaction with the bank, as illustrated in FIG. 4A. CGI scripts provide only limited two-way capabilities, as described above. Thus, due to this lack of a robust mechanism by which real-time Network transactions can be performed, the bank is unable to be a true "Network merchant," namely a merchant capable of providing complete transactional services on the Network.

Figure 4B:
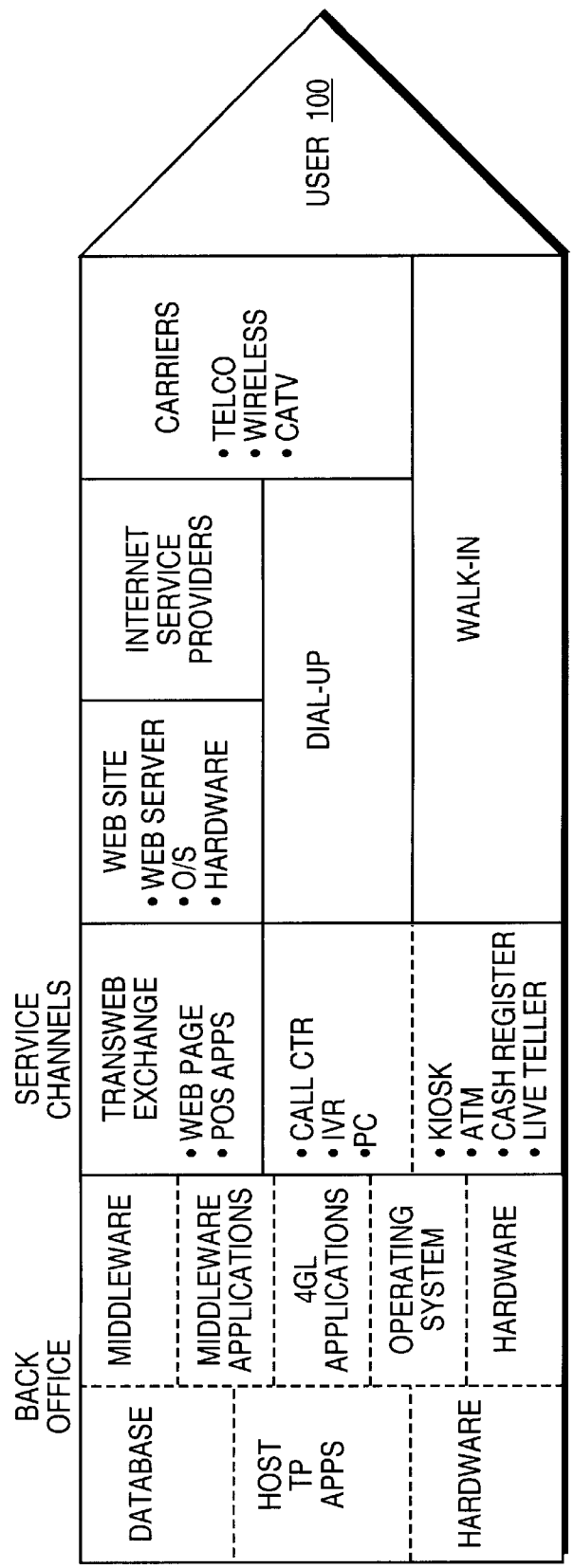
FIG. 4B illustrates one embodiment of the present invention.

According to one embodiment of the present invention, as illustrated in FIG. 4B, each merchant that desires to be a network merchant can provide real-time transactional capabilities to users who desire to access the merchants' services via the network. This embodiment includes a service network running on top of a facilities network, namely the Internet, the Web or e-mail networks. For the purposes of this application, users are described as utilizing PC's to access the network via network server "switching" sites. (Switching is described in more detail below). Users may also utilize other personal devices such as network computers or cellular devices to access the merchants' services via appropriate switching sites. These switching sites include non-Web network computer sites and cellular provider sites. Five components interact to provide this service network functionality, namely an exchange, an operator agent, a management agent, a management manager and a graphical user interface. All five components are described in more detail below.

Figure 5A:
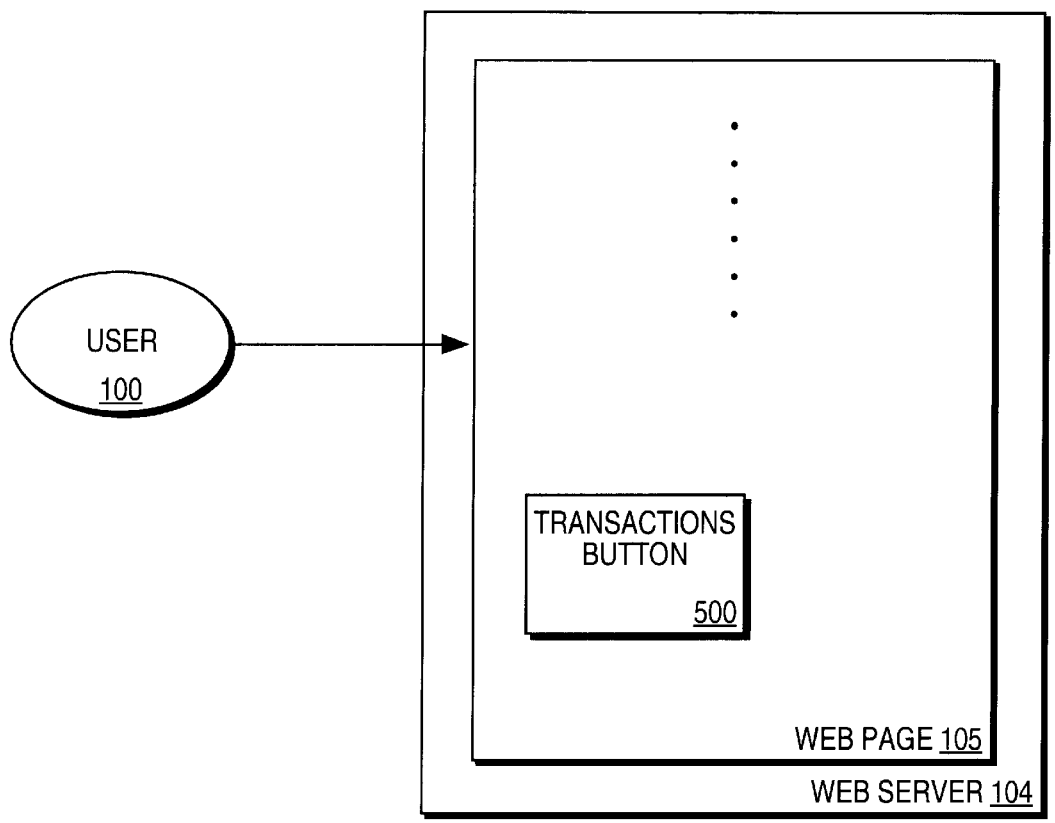
FIG. 5A illustrates a user accessing a Network server including one embodiment of the present invention.

As illustrated in FIG. 5A, user 100 accesses network server 104. Having accessed network server 104, user 100 can decide that he desires to perform real-time transactions. When network server 104 receives user 100's indication that he desires to perform real-time transactions, the request is handed over to an exchange component. Thus, from network page 105, for example, user 100 can select button 500, entitled "Transactions" and network server 104 hands user 100's request over to the exchange component. The button and the title can be replaced by any mechanism that can instruct a network server to hand over the consumer's request to the exchange component.

Figure 5B:
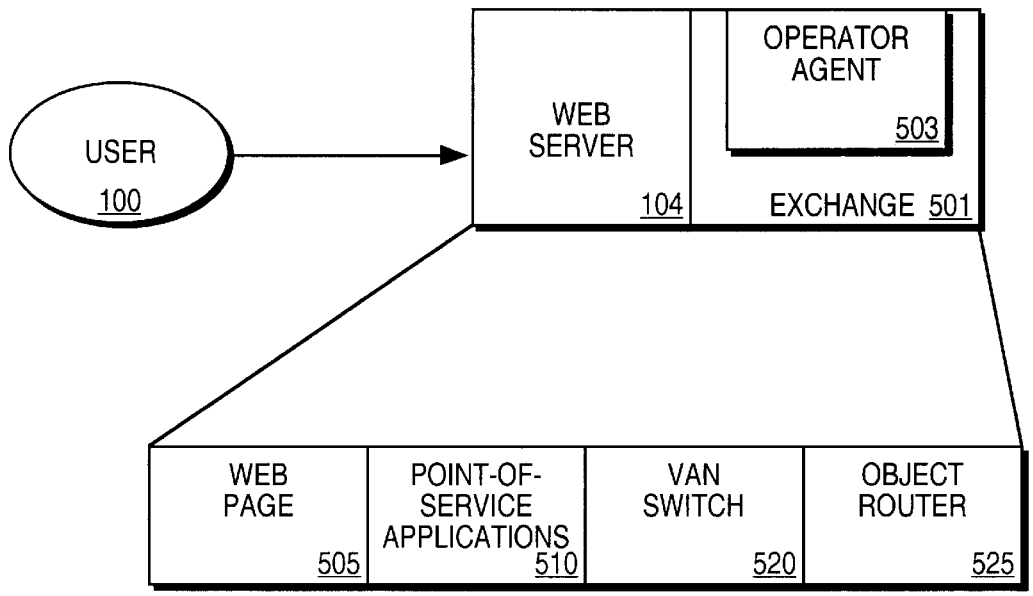
FIG. 5B illustrates the exchange component according to one embodiment of the present invention.

FIG. 5B illustrates exchange 501. Exchange 501 comprises network page 505 and point-of-service (POSvc) applications 510. Exchange 501 also conceptually includes a switching component and an object routing component (described in more detail below). POSvc applications 510 are transactional applications, namely applications that are designed to incorporate and take advantage of the capabilities provided by the present invention. Although exchange 501 is depicted as residing on network server 104, the exchange can also reside on a separate computer system that resides on the Internet and at the intersection point between the Internet and other networks and on any network where any network intersects with the Internet and has an Internet address. Exchange 501 may also include operator agent 503 that interacts with a management manager (described in more detail below). Exchange 501 creates and allows for the management (or distributed control) of a service network, operating within the boundaries of an IP-based facilities network. Thus, exchange 501 and a management agent component, described in more detail below, under the headings "VAN Switch and Object Routing," together perform the switching, object routing, application and service management functions according to one embodiment of the present invention.

Exchange 501 processes the consumer's request and displays an exchange network page 505 that includes a list of POSvc applications 510 accessible by exchange 501. A POSvc application is an application that can execute the type of transaction that the user may be interested in performing. The POSvc list is displayed via the graphical user interface component. One embodiment of the present invention supports HyperText Markup Language as the graphical user interface component. Virtual Reality Markup Language and Java™ are also supported by this embodiment. A variety of other graphical user interface standards can also be utilized to implement the graphical user interface.

Figure 5C:
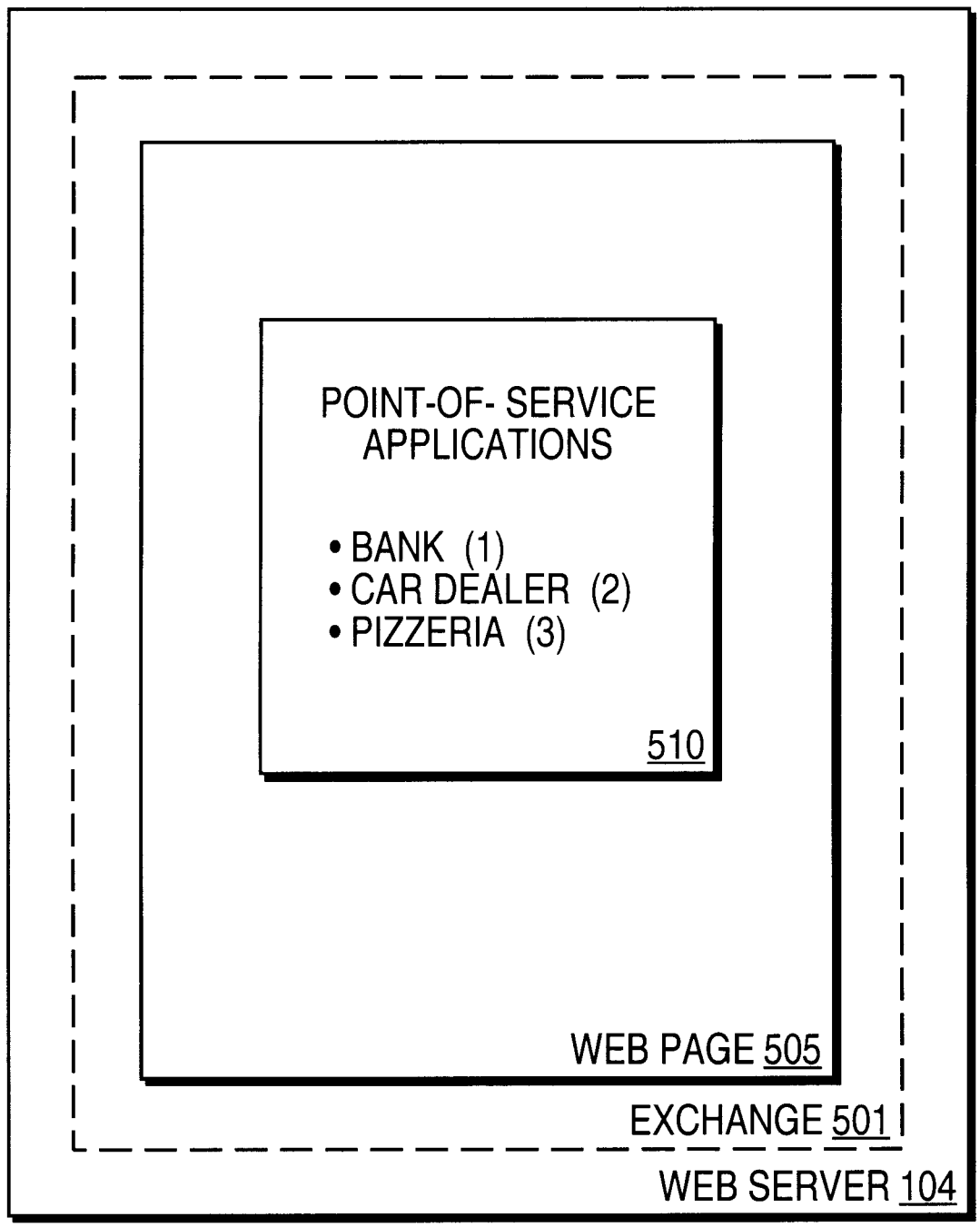
FIG. 5C illustrates an example of a point-of-service (POSvc) application list.
Figure 5D:
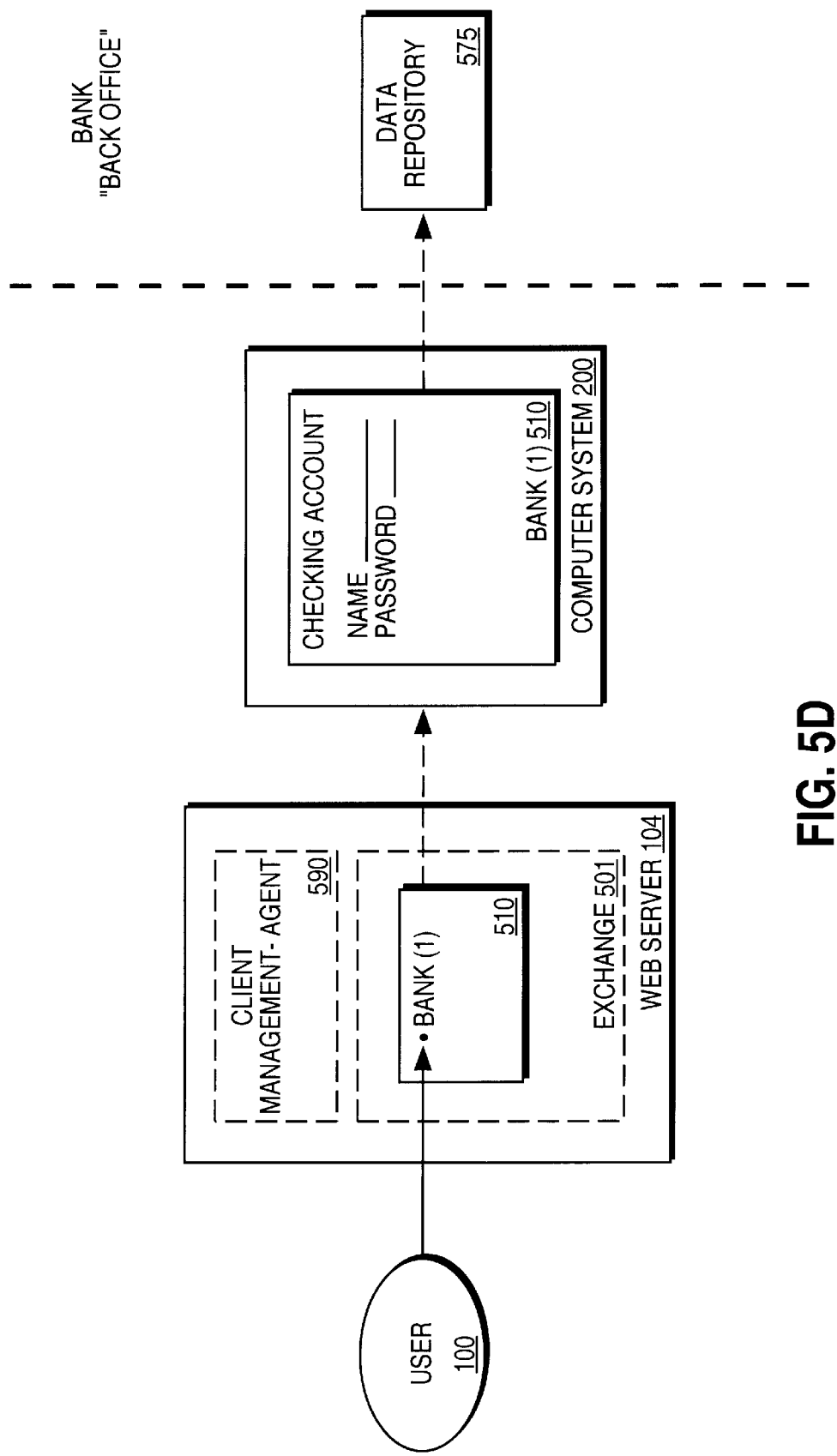
FIG. 5D illustrates a user selecting a bank POSvc application from the POSvc application list.

An example of a POSvc application list is illustrated in FIG. 5C. User 100 can thus select from POSvc applications Bank 510(1), Car Dealer 510(2) or Pizzeria 510(3). Numerous other POSvc applications can also be included in this selection. If user 100 desires to perform a number of banking transactions, and selects the Bank application, a Bank POSvc application will be activated and presented to user 100, as illustrated in FIG. 5D. For the purposes of illustration, exchange 501 in FIG. 5D is shown as running on a different computer system (network server 104) from the computer systems of the network merchants or content owners running POSvc applications (computer system 200). Exchange 501 may, however, also be on the same computer system as one or more of the computer systems of the network merchants.

Once Bank POSvc application 510 has been activated, user 100 will be able to connect to Bank services and utilize the application to perform banking transactions, thus accessing data from a host or data repository 575 in the Bank "Back Office." The Bank Back Office comprises legacy databases and other data repositories that are utilized by the Bank to store its data. This connection between user 100 and Bank services is managed by exchange 501. As illustrated in FIG. 5D, once the connection is made between Bank POSvc application 510(1), for example, and Bank services, an operator agent on network server 104 may be activated to ensure the availability of distributed functions and capabilities.

Each network merchant may choose the types of services that it would like to offer its clients. In this example, if Bank decided to include in their POSvc application access to checking and savings accounts, user 100 will be able to perform real-time transactions against his checking and savings accounts. Thus, if user 100 moves $500 from his checking account into his savings account, the transaction will be performed in real-time, in the same manner the transaction would have been performed by a live teller at the bank or an ATM machine. Therefore, unlike his prior access to his account, user 100 now has the capability to do more than browse his bank account. The ability to perform these types of robust, real-time transactions from a network client is a significant aspect of the present invention.

Figure 5E:
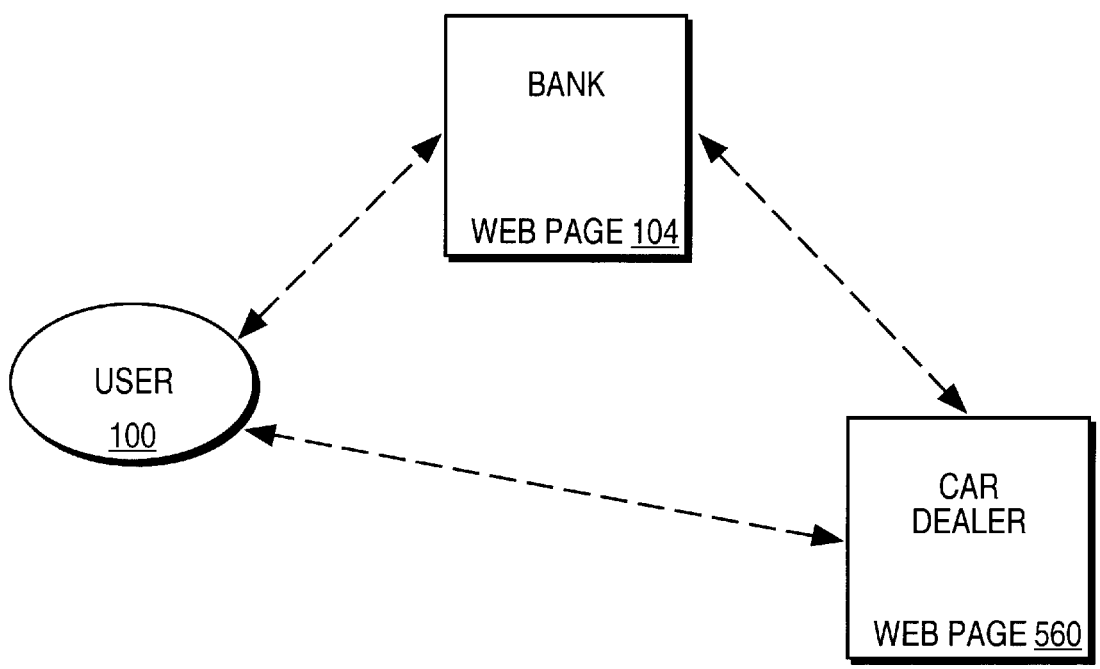
FIG. 5E illustrates a three-way transaction according to one embodiment of the present invention.

Bank can also decide to provide other types of services in POSvc application 510(1). For example, Bank may agree with Car dealership to allow Bank customers to purchase a car from that dealer, request a car loan from Bank, and have the entire transaction performed on the network, as illustrated in FIG. 5E. In this instance, the transactions are not merely two-way, between the user and Bank, but three-way, amongst the consumer, Bank and Car dealership. According to one aspect of the present invention, this three-way transaction can be expanded to n-way transactions, where n represents a predetermined number of merchants or other service providers who have agreed to cooperate to provide services to users. The present invention therefore allows for "any-to-any" communication and transactions on the network, thus facilitating a large, flexible variety of robust, real-time transactions on the network.

Finally, Bank may also decide to provide intra-merchant or intra-bank services, together with the inter-merchant services described above. For example, if Bank creates a POSvc application for use by the Bank Payroll department, Bank may provide its own employees with a means for submitting timecards for payroll processing by the Bank's Human Resources (HR) Department. An employee selects the Bank HR POSvc application, and submits his timecard. The employee's timecard is processed by accessing the employee's payroll information, stored in the Bank's Back Office. The transaction is thus processed in real-time, and the employee receives his paycheck immediately.

B. VAN Switching and Object Routing

Figure 6A:
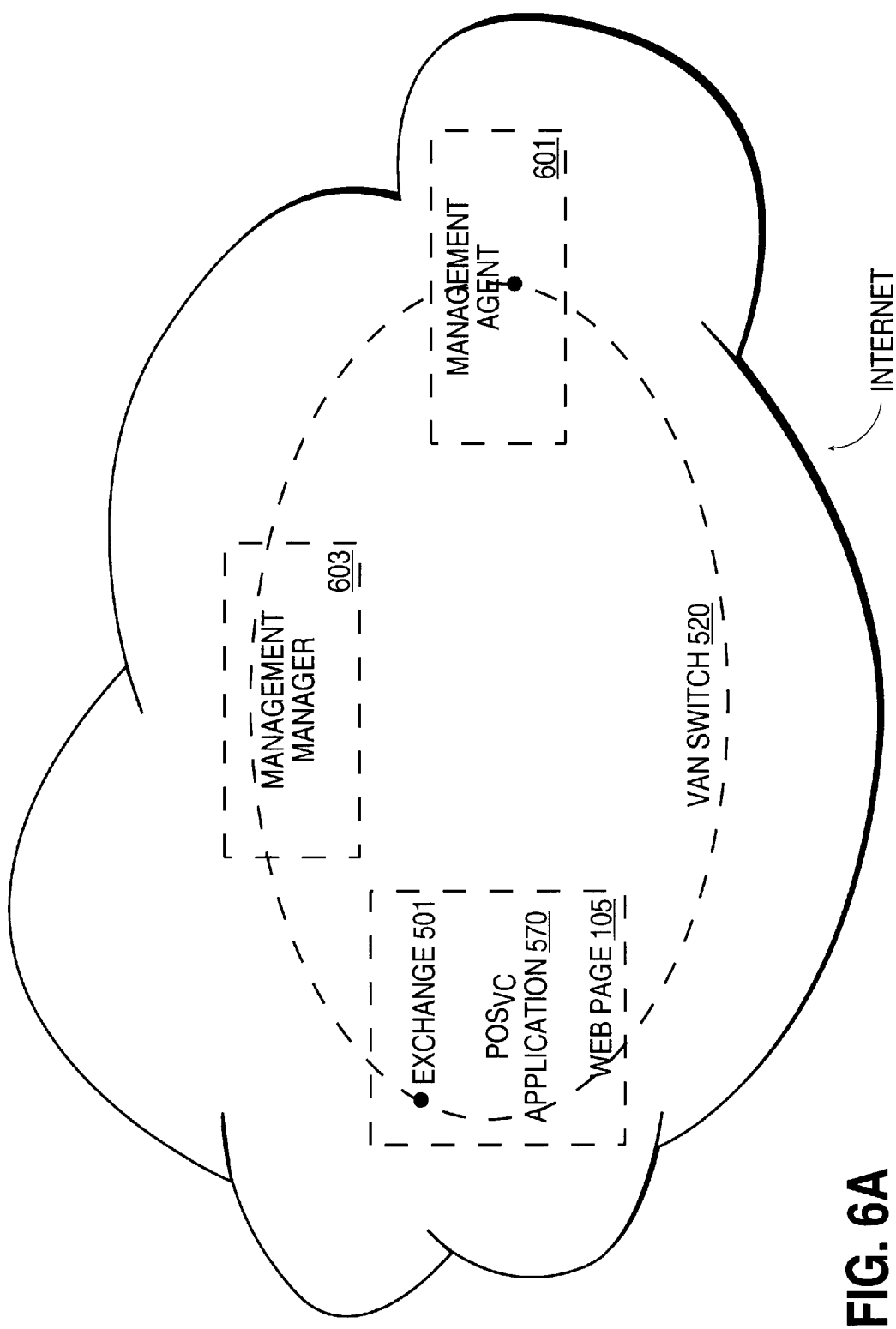
FIG. 6A illustrates a value-added network (VAN) switch.

As described above, exchange 501 and management agent 601, illustrated in FIG. 6A, together constitute a value-added network (VAN) switch. These two elements may take on different roles as necessary, including peer-to-peer, client-server or master-slave roles. Management manager 603 is illustrated as residing on a separate computer system on the Internet or anywhere where the Internet meets or intersects or interfaces with any network. Management manager 603 can, however, also reside on the same machine as exchange 501. Management manager 603 interacts with the operator agent 503 residing on exchange 501.

VAN switch 520 provides multi-protocol object routing, depending upon the specific VAN services chosen. This multi-protocol object routing is provided via a proprietary protocol, TransWeb™ Management Protocol (TMP). TMP may incorporate the same or additional security features as the traditional Simple Network Management Protocol, SNMP. It also allows for the integration of other traditional security mechanisms, including RSA security mechanisms, SET1, SET2, etc.

One embodiment of the present invention utilizes TMP and distributed on-line service information bases (DOLSIBS) to perform object routing. Alternatively, TMP can incorporate SSL, s-HTTP, Java™, CORBA, DCOM, the WinSock API, ORB or any other object network layer with DOLSIBs to perform and manage object routing. DOLSIBs are virtual information stores optimized for networking. All information entries and attributes in a DOLSIB virtual information store are associated with a networked object identity. The networked object identity identifies the information entries and attributes in the DOLSIB as individual networked objects, and each networked object is assigned an Internet address. The Internet address is assigned based on the IP address of the node at which the networked object resides.

Figure 6B:
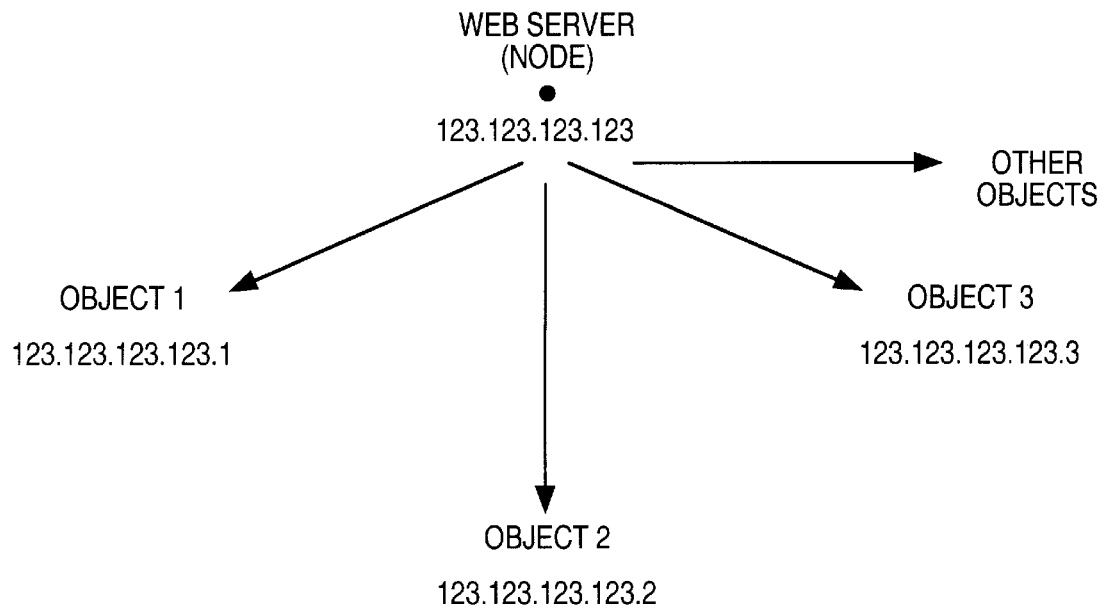
FIG. 6B illustrates the hierarchical addressing tree structure of the networked objects in DOLSIBs.

For example, in FIG. 5A, network server 104 is a node on the Internet, with an IP address. All networked object associated with network server 104 will therefore be assigned an Internet address based on the network server 104's IP address. These networked objects thus "branch" from the node, creating a hierarchical tree structure. The Internet address for each networked object in the tree essentially establishes the individual object as an "IP-reachable" or accessible node on the Internet. TMP utilizes this Internet address to uniquely identify and access the object from the DOLSIB. FIG. 6B illustrates an example of this hierarchical addressing tree structure.

Each object in the DOLSIB has a name, a syntax and an encoding. The name is an administratively assigned object ID specifying an object type. The object type together with the object instance serves to uniquely identify a specific instantiation of the object. For example, if object 610 is information about models of cars, then one instance of that object would provide user 100 with information about a specific model of the car while another instance would provide information about a different model of the car. The syntax of an object type defines the abstract data structure corresponding to that object type. Encoding of objects defines how the object is represented by the object type syntax while being transmitted over the network.

C. Management and Administration

Figure 7:
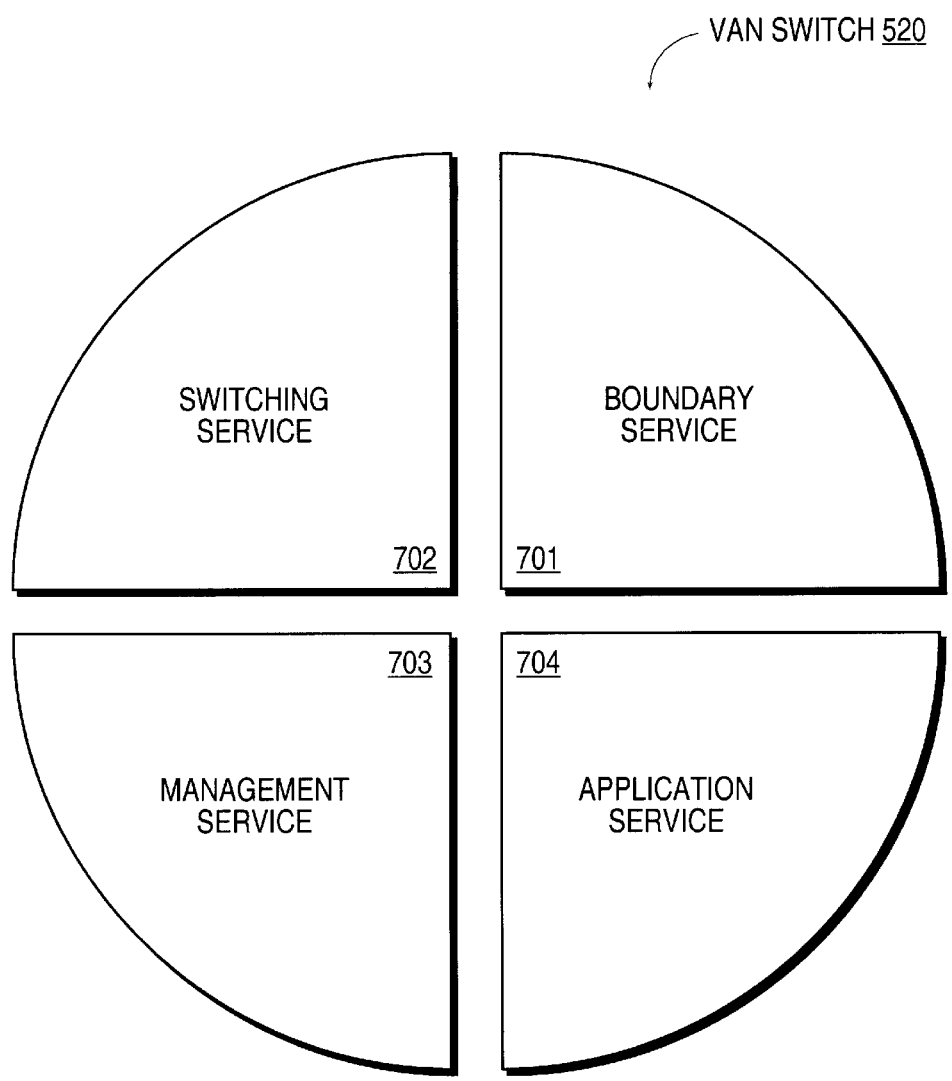
FIG. 7 illustrates conceptually the layered architecture of a VAN switch.

As described above, exchange 501 and management agent 601 together constitute a VAN switch. FIG. 7 illustrates conceptually the layered architecture of VAN switch 520. Specifically, boundary service 701 provides the interfaces between VAN switch 520, the Internet and the network, telephone companies, wireless systems, cable television networks, and multi-media end user devices such as PCs, televisions or telephones. Boundary service 701 also provides the interface to the on-line service provider. A user can connect to a local application, namely one accessible via a local VAN switch, or be routed or "switched" to an application accessible via a remote VAN switch.

Switching service 702 is an OSI application layer switch. Switching service 702 thus represents the core of the VAN switch. It performs a number of tasks including the routing of user connections to remote VAN switches, described in the paragraph above, multiplexing and, prioritization of requests, and flow control. Switching service 702 also facilitates open systems' connectivity with both the Internet (a public switched network) and private networks including back office networks, such as banking networks. Interconnected application layer switches form the application network backbone. These switches are one significant aspect of the present invention.

Management service 703 contains tools such as Information Management Services (IMS) and application Network Management Services (NMS). These tools are used by the end users to manage network resources, including VAN switches. Management service 703 also provides applications that perform Operations, Administration, Maintenance & Provisioning (OAM&P) functions. These OAM&P functions include security management, fault management, configuration management, performance management and billing management for the service network. Providing OAM&P functions for applications in this manner is another significant aspect of the present invention.

Finally, application service 704 contains application programs that deliver customer services. Application service 704 includes POSvc applications such as Bank POSvc described above, and illustrated in FIG. 6A. Other examples of VAN services include multi-media messaging, archival/retrieval management, directory services, data staging, conferencing, financial services, home banking, risk management and a variety of other vertical services. Each VAN service is designed to meet a particular set of requirements related to performance, reliability, maintenance and ability to handle expected traffic volume. Depending on the type of service, the characteristics of the network elements will differ. VAN service 704 provides a number of functions including communications services for both management and end users of the network and control for the user over the user's environment.

Figure 8:
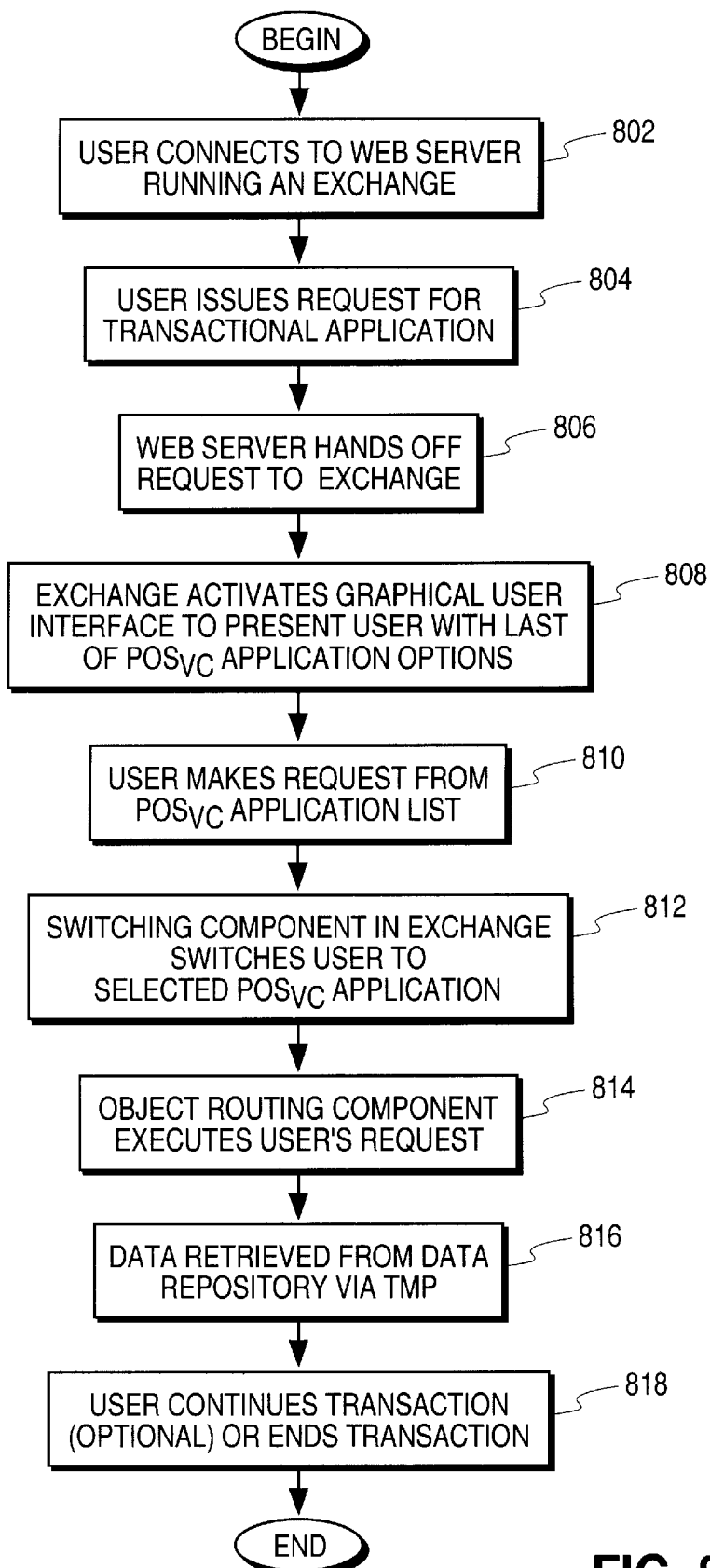
FIG. 8 is a flow diagram illustrating one embodiment of the present invention.

FIG. 8 is a flow diagram illustrating one embodiment of the present invention. A user connects to a Web server running an exchange component in step 802. In step 804, the user issues a request for a transactional application, and the web server or cell site or call center hands off the request to an exchange in step 806. The exchange activates a graphical user interface to present user with a list of POSvc application options in step 808. In step 810, the user makes a selection from the POSvc application list. In step 812, the switching component in the exchange switches the user to the selected POSvc application, and in step 814, the object routing component executes the user's request. Data is retrieved from the appropriate data repository via TMP in step 816, and finally, the user may optionally continue the transaction in step 818 or end the transaction.

The Present Invention Applied to Internet Commerce

The goal of Internet commerce is to effect a valid financial transaction from any access point on the net with any other point on the net, spanning both public and private enterprise networks, in real-time, interactively.

Achieving this goal of true, real-time, N-way transaction interactivity requires a combination of: (1) a many-to-many transaction interface, (2) multi-media archival and retrieval management, and (3) a viable switching model, all with the following attributes:

robust
secure
reliable
high-performance
predictable
configurable
portable
compliant with standards (de facto or de jure)

Currently, a user with a PC and a network browser can access the Web page of various merchants. The present invention extends this one-way browsing capability to N-way, real-time, interactive communication, beyond the Web into IP networks and other types of heterogeneous networks as described above. The present invention brings a remote cash register, telephone and mailbox into the end user's terminal. It reaches everybody and everywhere, much as the telephone does.

The present invention extends the same paradigms as are traditionally used to manage routers and network devices, to interactively reach and manage information. The present invention invigorates the interactive transaction paradigm by offering scalability, robustness, and flexibility designed to be deployed across an entire value supply chain from original manufacturer to point of purchase.

The present invention uses an N-tier Manager-Agent model to implement the N-way communication capability. One part of the present invention is a value—added network application that resides at the transaction Network Entry Point. The other part of the invention resides at remote IP nodes. The present invention includes an N-way interactive object router that provides the link between the consumers, the cash source, and the service provider.

An electronic commerce service provider, such as a Bank, will have to operate like a mini-Telco in order to provide services, such as business-to-business electronic commerce, or homebanking, via the Internet.

Thus, the following system requirements are needed:
security, so as to avoid fraudulent transactions and invasions into the service provider's database.
unified numbering plan to identify each station by a unique address, that is convenient and readily understandable by other stations connected to the network.
uniquely identify, retrieve and route dynamically changing information elements that have to be accessed remotely, using multi-media, object routing.

The Object Router

The Object Router includes a library providing support for the application programming interfaces (APIs) to remotely access an object, its data and its functions in an object network. This interface provides two types of a class: a skeleton, which is the functionality of the object and its stub which allows remote access of the same object. It will be apparent to those of ordinary skill in the art that the items defined below represent an implementation of the preferred embodiment. Other embodiments will be apparent such as non-C++ and non-Java implementations and implementations such as within a DSP chipset.

| Glossary | |
|---|---|
| Item | Its definition. |
| Abstract Class | A C++ class which does not have all virtual functions defined. |
| API | Application Programming Interface |
| Class | A C++/Java data structure definition which defines both the data and functions. |
| Interface | A Java term similar to the C++ Abstract Class. |
| Meta | A "meta"-compiler translates a higher level "meta"-language (WebX) from the "meta"-file into a lower-level language (C++) output file for and before giving to a traditional compiler. |
| Object | A C++/Java data structure instance, which is defined by a class. |
| TCL | Tool Command Language, developed by Ousterhout at Berkeley. |

Architectural Overview and Key Features

The Object Router of the present invention allows the user to specify functions which can be executed remotely. The basic operation uses objects and class information, instead of simple, unrelated functions and data. The arguments to the function is specified in the meta file and the type of argument passing (by value or by reference) can also be specified.

The Object Router allows for new data types to be constructed, using the basic data types of the programming language used in the preferred embodiment: int and String. Single simple inheritance classes can be constructed and then used as data members or pointer within another meta class.

Also, the Object Router allows for a transparent remote or local operation. The programmer does not need to know whether the object is "local" or "remote". The interface automatically determines this and will allow for the correct operation based on the type of object.

Requirements

Figure 9:
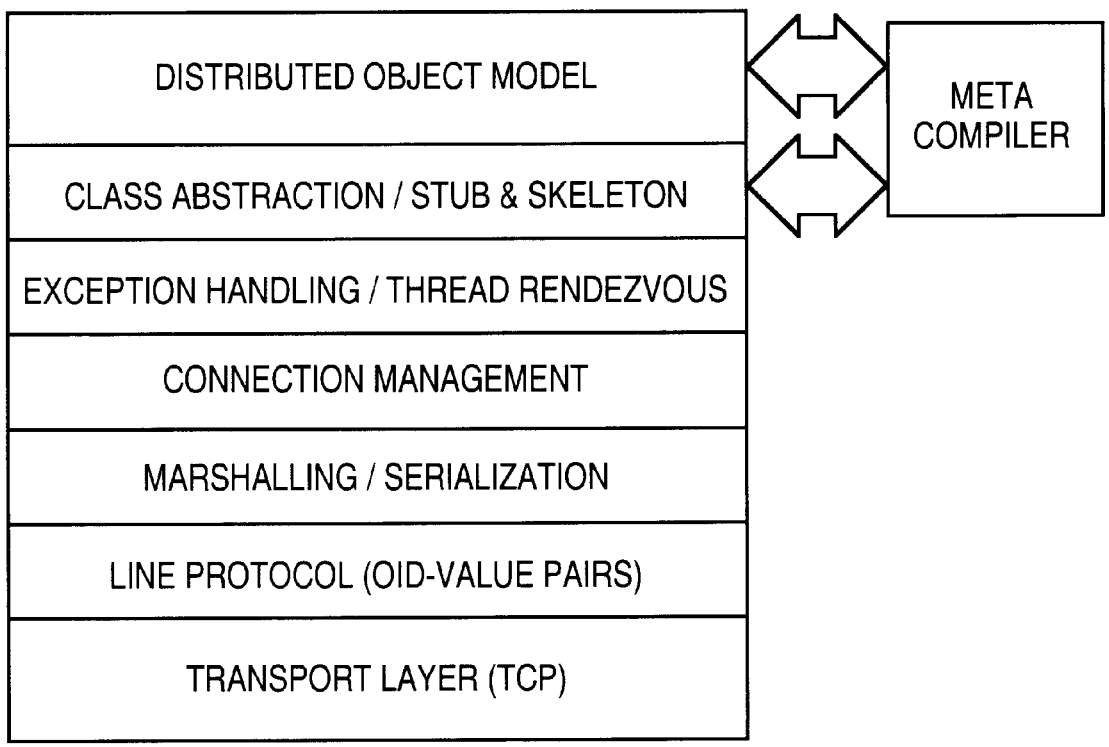
FIG. 9 illustrates the software layers of the Object Router.

There are several requirements for the Object Router to provide a clean and transparent operation of local and remote object. FIG. 9 illustrates these basic requirements and operations layers of the object layer.

A. Object Identity

This is needed for the Object Router to determine if the object is local (skeleton) or remote (stub). This is also needed to determine argument parameters and object serialization. This feature is provided in the preferred embodiment by the WxObject in the wx.lib library. Each new class "XYZ" must add a XYZ_ClassID, XYZStub_ClassID and XYZSkel_ClassID to the Wx/ClassID.h file.

B. Network Line Protocol/TCP

This is needed to communicate with the remote computer using some known alphabet. For the Object Router, WxRemotePDU provides this protocol data unit (PDU) and transmits the data using the RWCollectable data serialization.

C. Data Serialization

To transfer data between computers, the parameters and the objects themselves need to be sent over the network. This is the serialization of the data onto a network stream. The framework for this is provided by the persistence nature of RWCollectable. The code is generated by the meta compiler in the skeleton.

D. Data Marshaling

To ensure that all data is passed as arguments to a method requires the user to check all parameters and throw an exception, if there is something missing or wrong. This is provided by the meta compiler in the stub and skeleton.

E. Thread Rendezvous

To block a thread during network transmission and reception, the object must use a different thread to perform the actual network activity and control the calling thread status. This allows calling a remote object to behave similar to a local object. This is performed by the Rogue Wave RWCondition class in the WxRemotePDU class.

F. String Execution

This allows for a method to be called from an ASCII string representation. This is useful since it provides a simple, but unique means of calling a class method. This can also be used by the programmer directly. This data marshaling is created by the meta compiler in the base class.

G. Reference Counting

By maintaining reference counts in both the local and remote objects, time consuming malloc's and free's are avoided as well as confusing details of which function is responsible for deleting which object. This is provided by the Object Router in dealing with WxRemoteObject types. Likewise, the programmer must use reference counting. In other words, the user cannot destroy a WxRemoteObject child using delete (an exception is thrown, if this is tried), but rather the member function ol_unreference( ). Also, if a user stores a copy of a WxRemoteObject child, it must indicate this by calling the method ol_reference( ). Otherwise, the object may be destroyed by someone else. This interface is provided by WxRemoteObjectInt.

H. Abstract Base Class

To operate on an object without knowing its location (local or remote) requires an abstract class which forms as the base class. This is the base class, which is the parent of both the stub and skeleton. This is an abstract object (cannot be instantiated alone) and is created by the meta compiler.

I. Stub/Skeleton Multiple Inheritance

The client and server classes are inherited from the abstract base class and from their respective object layer classes. This allows them to inherit the functionality of the base class as well as the object layer routines. This is created by the meta compiler.

J. Meta Compiler

All of the above features need to be coded by hand unless there is some automated mechanism to do this. The Meta compiler takes a definition file and creates (using TCL or other encoding) the above requirements: Object Identity, Data Serialization, Data Marshaling, String Execution, Abstract Base Class, and the Stub/Skeleton Multiple Inheritance. If one were to code all of this by hand for even the simplest class, there would be too many errors to even manage. The meta compiler (rme2c) eliminates these errors.

K. User-defined Data Model

This is the user created set of classes built around and on top of the Object Router APIs. This is the basis of the object layer to the next level up the software layers. This foundation appears local to the programmers using the object layer even though it may be remote.

Components

Figure 10:
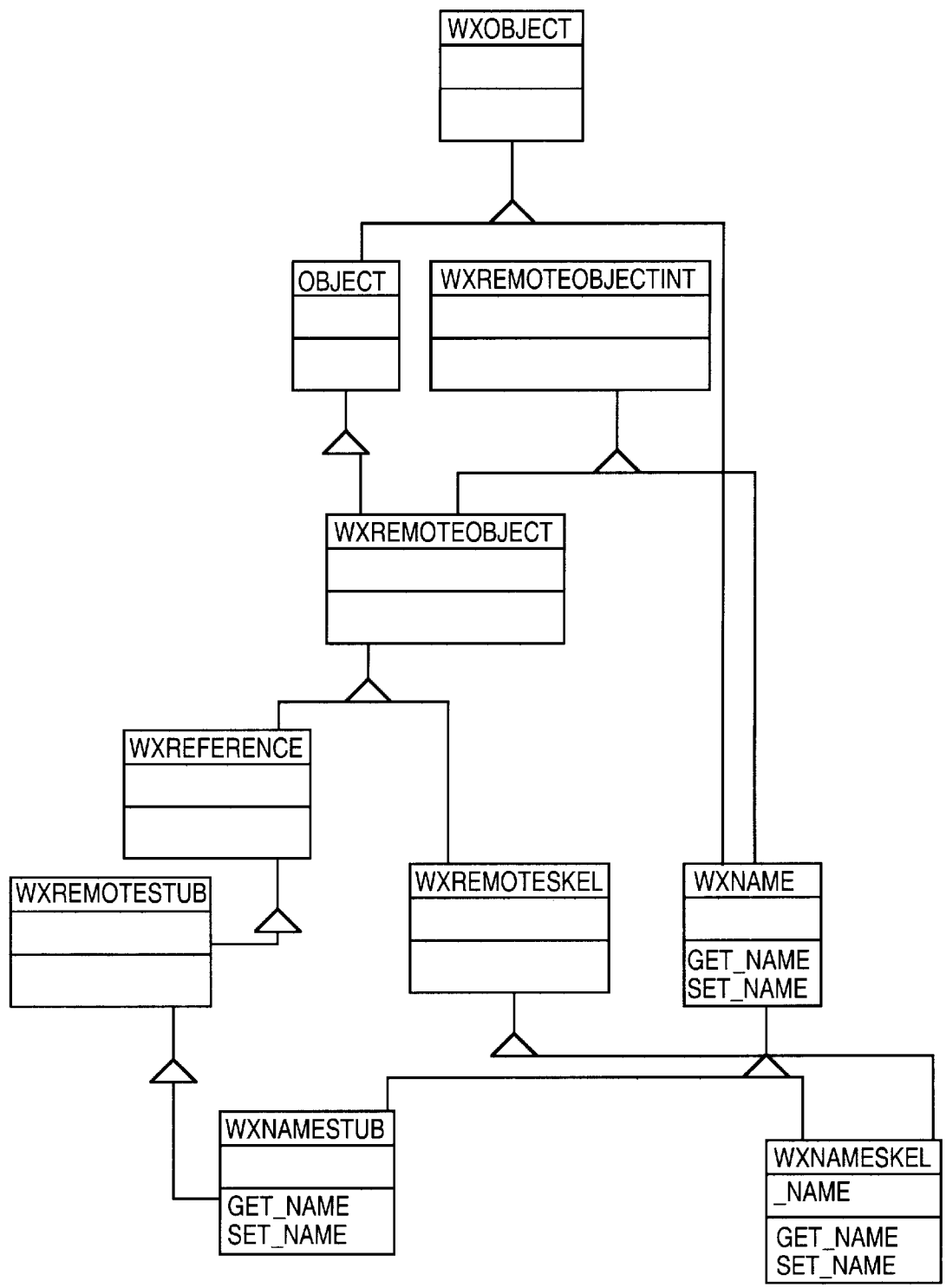
FIG. 10 illustrates the data model integration.

There are only certain parts of the Object Router, which the programmer needs to be aware of. The most important is the base class WxRemoteObject. As shown in FIG. 10, there is an interface specification WxRemoteObjectInt which is inherited by both the object layer objects and the data model objects. For purposes of example, WxName is a new data model object, which contains one data member "name" which is a String. The meta compiler automatically creates two access components for this data member: get_name and set_name. In addition, the meta compiler also creates the local and remote versions of this data object: WxNameSkel and WxNameStub, respectively.

WxRemoteObjectInt

The abstract base class not only contains all of the member methods and data access components, but it contains support functions which provide a uniform interface to behave as a WxRemoteObject. This includes:

WxStringExecution to execute any method using a simple ASCII string, and Object type data.

WxLock, which provides a thread synchronization mechanism.

WxFlags, which provides a simple and consistent boolean flag variables.

reference counts, which allow WxRemoteObjects to be shared without ownership concerns.

conversions between Object, WxRemoteReference, WxRemoteStub and WxRemoteSkel types.

WxRemoteSkel (Server)

The skeleton represents the server side of the Object Router. This is a class, which is derived off the abstract base class WxName (in the diagram) and WxRemoteSkel. All of the methods (except data access components) must be defined by the programmer for the skeleton since this is the actual object. Whenever a real instance of the class is created, it will have the suffix "Skel".

WxRemoteStub (Client)

This is the client (or remote) side of an object. This is similar to the skeleton because it too is derived off the abstract base class WxName and an object layer class WxRemoteStub. However, there is nothing for the programmer to define for this class. All methods are generated by the meta compiler.

Meta Compiler

This is a TCL program in the preferred embodiment, which creates the three classes: abstract base, stub and skeleton. For each class an interface file (header file .h) and a C++ definition file (source code .cpp) is created. It will be apparent to those of ordinary skill in the art that the implementation defined below represents an implementation of the preferred embodiment. Other embodiments will be apparent such as non-TCL, non-C++ and non-Java implementations and implementations such as within a DSP chipset.

Style Issues

Prefixes

The StringExecutionInt class prepends all of its member functions with "se_". Likewise, the object layer classes all prepend their member functions with "ol_". This is needed to avoid any name-bashing with derived classes which are built using the base classes created by the meta compiler.

Member Data

In addition, in the skeleton, all member data is prefixed with "_" to remind the user that the data is local to the object and usually protected.

Synchronization

Any modification of local member data within a skeleton should be guarded by ReadLockGuard or WriteLockGuard when accessed since other threads may be sharing this data.

Stubs and Skeletons

All skeletons are suffixed with "Skel" while all stubs are appended with "Stub".

Value and References When passing WxRemoteObject derived data, it is also passed with a pointer. However, since it is unclear from this alone who has ownership of the data, the suffixes "_ref" and "_val" are added by the meta compiler to indicate if the data is passed by value or reference. If it is passed by reference, the function then will return a pointer, which has had the reference count incremented. If passed by value, the data is copied from the original source and the receiver should unreference this with DeleteObject.

To indicate if a data member is passed by reference, append an asterisk "*" to the data type in the "data" declaration section of the Object Router meta file. This is also true for return types in the "method" section and as arguments to methods.

const Whenever data is passed by value into a function, it will be proceeded with "const" to signify that the object is not to be changed.

Wx/ClassID.h

This header file contains all ClassIDs for the base classes and their stubs and skeletons. The programmer should place the object ID in this before running the Object Router meta compiler.

CC and HH files

These files are included from the Object Router meta file to add additional functionality to the base, stub or skeleton. If, for example, a function void xyz( ) needed to be added to the XYZ skeleton class, then add to the XYZ.rme file:

include hskel
void xyz( );
endinclude
include cskel
include "XYZSkel.cc"
endinclude This will then include the simple declaration "void xyz( )" into the header for the skeleton and also include the definition for xyz( ) from the XYZSkel.cc file. The advantage to using the suffix "cc" or "hh" over "cpp" and "h" is because the Object Router meta compiler uses those suffixes for the final XYZ files.

CPP and H files

These files are automatically generated by the Object Router meta compiler for the base, skel and stub. If the programmer wishes to add information to these files, see the examples above. The programmer should not, however, edit the cpp or h files directly. The programmer should be able to fix anything by modifying the rme file and recompiling.

Strings

Strings used in the object layer may be passed either by value using RWCString and "const char*" or by reference using the RWCollectableString (aka String). In some cases, the programmer knows which version is most desirable: pointer or static object. Based on programmer need, the programmer can choose either the function foo( ) which returns the string by value or foo_ptr( ), which calls the same function but returns a copy of the string on the heap as a pointer.

Data access components

For each data member, two data access components are automatically created for the data: "get" and "set". There, however, are complications to these, based on the type of data.

A. integer

This is the simplest and creates member functions int gelxyz( ) const and void set_xyz(int).

B. String

This is mentioned above and creates three methods: RWCString get_xyz( ) const, String *get_xyz_ptr( ) and set_xyz(const char*).

C. WxRemoteObject by value

This creates two functions: XYZ* get_xyz_val( ) const and void set_xyz(const XYZ*).

D. WxRemoteObject by reference

This also creates two functions: : XYZ* get_xyz_ref( ) const and void set_xyz(XYZ*). This also assumes that the "set" function will retain a copy of the object.

Meta Compiler

Usage

This is used by running the command:
rme2c<classname>
where the classname is the base class (such as Account). The Account.rme file must be in the same directory as well as other parent definitions.

The Object Router TCL files are found under Wx/Util. These files parse the description file and produce the six C++ output files.

Syntax

In the preferred embodiment, the syntax must be adhered to closely. Blank lines and lines beginning with a pound sign "#" are considered comments.

The following words are reserverd:

1. include [c*,h*,j*,*base,*skel,*stub]

This adds verbose code to be added to one of six files: cbase, hbase, cstub, hstub, cskel or hskel.

The programmer can also specify all "c" files or "h" files. The programmer can also specify "base", "skel" or "stub" files.

2. endinclude

The ends the verbose inclusion.

3. header <class>

This indicates that the compiler will wait for the header section to complete.

4. beginclass <class> [<parent>]

This indicates the class name and any parent.

5. begindata

This signals the begin of the data section 6. data [<perm>] <type> <name>

This is a data definition statement.

7. enddata

This is the end of the data section.

8. beginmethod

This is the beginning of the method section.

9. method [const] [<penn>] <return_type> <name> [{<arg1_type> <arg1_name>}, . . .]

This is a method definition.

10. endmethod

This is the end of the method section.

11. endclass

This is the end of the class definition. It should be the last statement in the file.

Operational Overview

The simplest way to introduce the operation of this object layer is through an example.

Scenario

Figure 11:
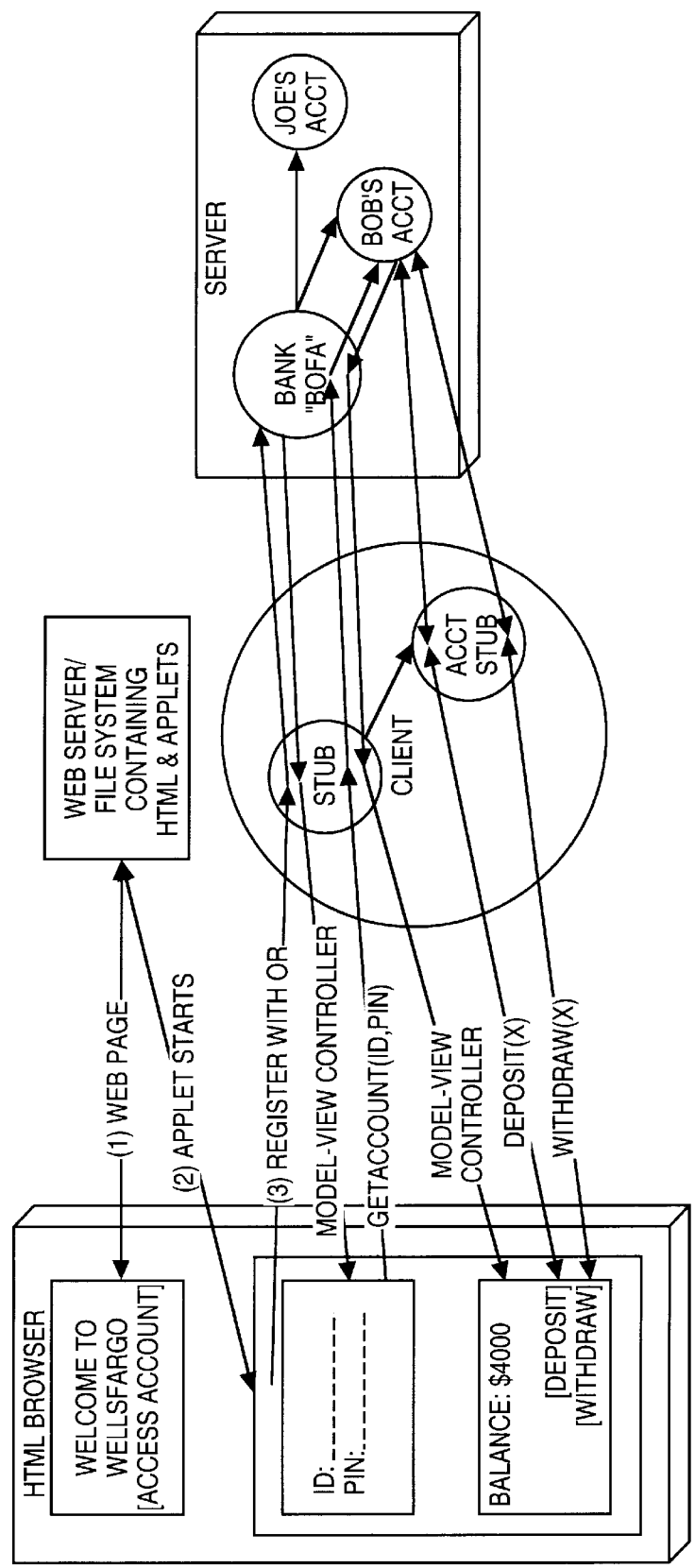
FIG. 11 illustrates a bank scenario example.
Figure 12:
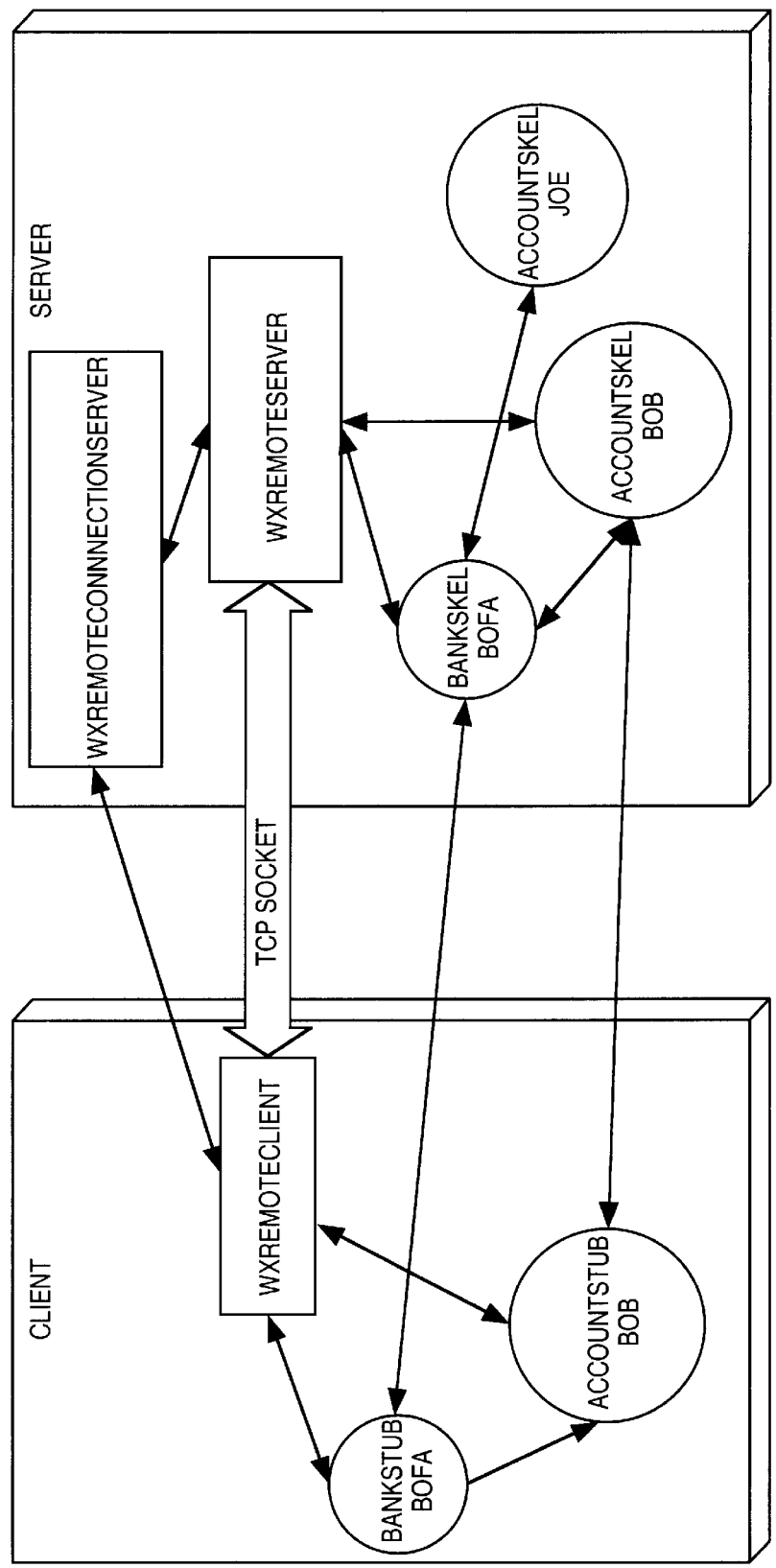
FIG. 12 illustrates a bank client-server example.

Referring to FIGS. 11 and 12, consider a sample bank in which there is a main bank object "BofA" and several bank Accounts "bob" and "joe". On the remote client side, the programmer first must establish contact with the remote server and then receive the Bank object on the client side as a stub. Once the stub is received, the client can then look up accounts just as if the programmer was local to the skeleton on the server side. In fact, the programming code is the same and can be reused on either the client or server side. In addition, the programmer does not need to know where the actual object resides: locally or remote.

Object Router Data

The programmer must first create a definition file describing the WxBank and WxBankAcount objects. This is written in a simple language, which is parsed by the rme2c meta compiler of the present invention.

WxBankAccount

The WxBankAccount file is written as:

```
include cskel
# INCLUDE ANY ADDITIONAL C CODE FOR THE SKELETON
#include "WxBankAccountSkel.cc"
endinclude
beginclass WxBankAccount
begindata
# PUT MEMBER DATA HERE
data int balance
end data
beginmethod
# PUT MEMBER METHODS HERE
method void deposit {int x}
method void withdraw {int x}
endmethod
endclass
```

This class contains not only methods but also data. In this case, the data is simply an integer describing the amount of money the account holds. The two methods: deposit and withdraw, simply increment and decrement this amount, respectively.

```
void WxBankAccountSkel::deposit(int x) {
  WriteLockGuard lock(wxlock());
  _balance += x;
}
void WxBankAccountSkel::withdraw(int x) {
  WriteLockGuard lock(wxlock());
  _balance -= x;
}
```

Notice that the programmer should add the lines:

```
WriteLockGuard lock(wxlock( ));
``` to provide thread locking on this object. It is as simple as copy and paste to provide this feature for each method. If the method is const and only accesses data, use

```
WriteLockGuard lock(wxlock( ));
``` and of course, if the programmer locks the method, he/she cannot call any other locked method which includes any object-layer defined data access components.

The above file (WxBankAccountSkel.cc) defines the skeleton methods. All the stub methods are defined by the rme2c meta compiler.

WxBank

For the Bank object, the Bank.rme file would look like:

```
# INCLUDE ANY ADDITIONAL C CODE FOR THE SKELETON
include cskel
#include "WxBankSkel.cc"
endinclude
# INCLUDE ALL H FILES FOR DATA TYPES USED IN ALL C FILES
include c
#include "WxBankAccountSkel.h"
#include "WxBankAccountStub.h"
endinclude
beginclass WxBank
# PUT MEMBER DATA HERE
begindata
enddata
# PUT MEMBER METHODS HERE
beginmethod
method const WxBankAccount* getAccount {int id} {int pin}
endmethod
endclass
```

This file, when processed by rme2c will create six files: WxBank.h, WxBank.cpp, WxBankStub.h WxBankStub.cpp, WxBankSkel.h and WxBankSkel.cpp. These six files describe the operation and remote execution of the WxBank object. Since there is no data, there will be no data access components generated. The method "getaccount" requires some explanation. The line below defines this method:

method const WxBankAccount* getaccount {int id} {mint pin}

The first keyword "const" identifies that this method will not change the object data. The next keyword is the returned object "WxBankAccount*". The asterisk identifies that the object will be passed by reference. The method name is next. Then, all of the parameters follow. In this case there are two. Each parameter is enclosed in braces and contains the data type and the parameter name. In this case there are two integer parameters with name id and pin. The programmer, however, must still describe any additional functionality for the operation of this object and the definitions of the skeleton methods (contained in the WxBankSkel.cc file). The WxBankSkel.cc file would contain:

```
WxBankAccount* bob = 0;
WxBankAccount* WxBankSkel::getAccount_ref(int id, int pin) const {
  if(bob) bob->ol_reference();
  return bob;
}
```

This example is a very simple one in which getAccount will always return bob's account. There are two things to notice.

1. The actual method name is "getAccount_ref" with "ref" appended since this method will return an object by reference.
2. But before simply returning the global variable bob, we must increment its reference count since getaccount is passing a new reference.

Example Client/Server

The client and server are now simple. The server side creates the skeletons and registers them in the name server:

```
extern WxBankAccount* bob; // global used by Bank::getAccount()
void main(int argc, char* argv) {
    RWWinSockInfo winsock; // initialize the socket library
    WxRemoteConnectionServer s; // create the socket server
    WxBank bofa; // create a bank
    WxBankAccount joe; // create joe's account
    joe.set_balance(0); // with a $0 balance
    bob = new WxBankAccount(); // create bob's account
    bob->set_balance(10000); // with a $100 balance
    bob->deposit(20000); // then, deposit $200.
    // register bofa with a global name --- after everything else is done!
    bofa.set_ol_name(new String("BofA"));
    // start the connection server receiver
    RWThread server =
       rwMakeThreadFunction(
          s,&WxRemoteConnectionServer::run,(RWBarrier*)0);
    server.start();
    server.join();
}
```

The client program is just as simple:

```
// create a global function which is called from a RogueWave thread.
void async() {
    WxRemoteConnectionMonitor monitor;
    WxRemoteClient* local = monitor.client("localhost");
    WxBank* bofa = LOOKUP(WxBank,"BofA",local);
    WxBankAccount* bob = bofa->getAccount(10,20); // arguments are
        dummy
    cout << "bob's account balance is (should be 30000):"
        << bob->get_balance() << endl;
    bob->withdraw(5000); // withdraw $50.
    cout << "bob's new balance is "<<bob->get_balance() << endl;
}
void main(int argc, char* argv) {
    WxRemoteObject::initializeStringExecutionTables();
    WxBankSkel::wxClassHierarchy();
    WxBankStub::wxClassHierarchy();
    WxBankAccountSkel::wxClassHierarchy();
    WxBankAccountStub::wxClassHierarchy();
    RWWinSockInfo winsock;
    // start the RogueWave thread - and wait until it exits
    RWThread thread = rwMakeThreadFunction(async);
    thread.start();
    thread.join();
}
```

The major benefit demonstrated above is that the programmer does not have to know, nor care, whether the object "bob" is local or remote.

Architecture Details

Design Considerations

There are a number of trade-offs and considerations taken into account during the creation of the object layer. These are briefly described below:

Class Overview

Figure 13A:
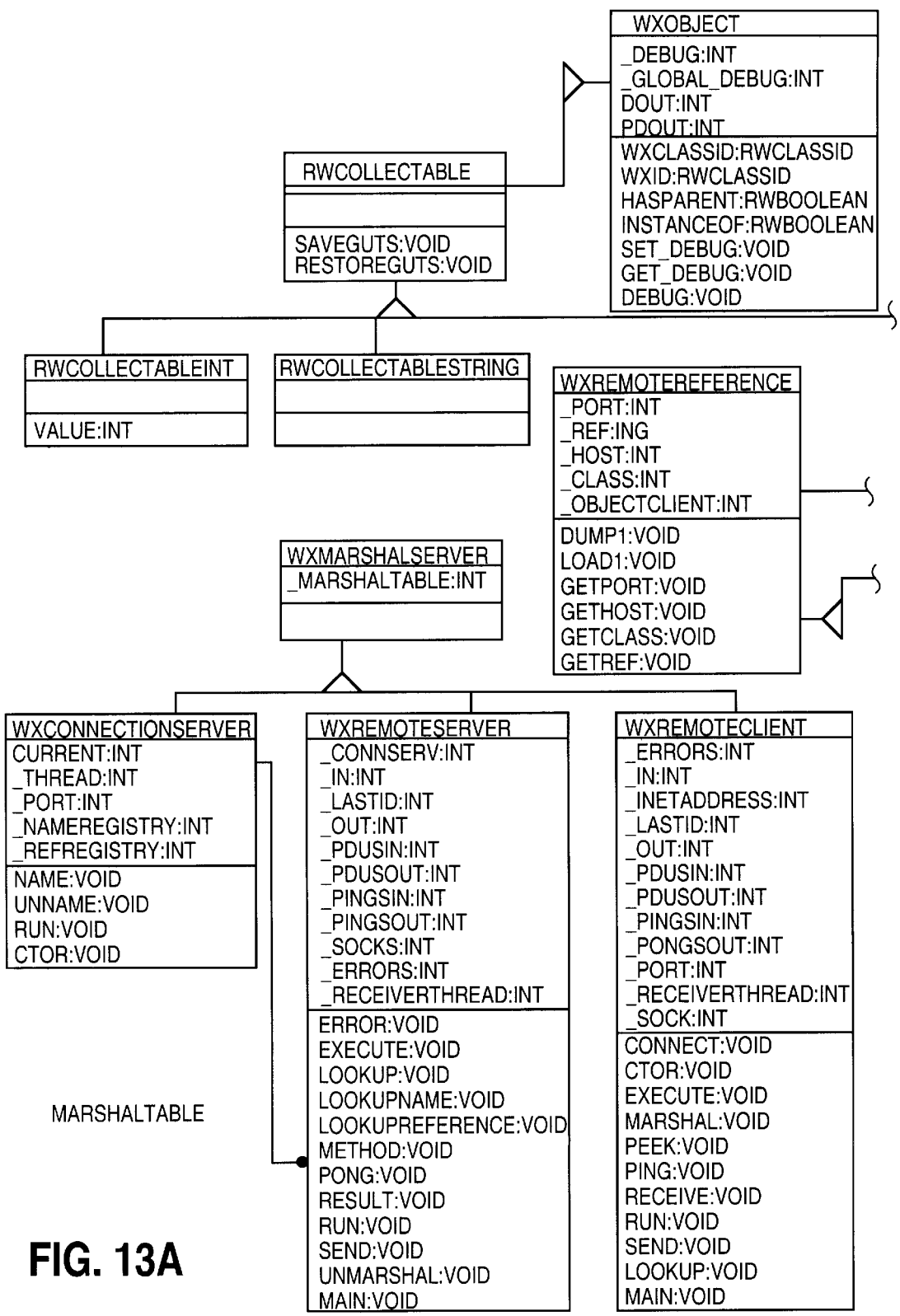
FIG. 13 illustrates a class diagram of the preferred embodiment.
Figure 13B:
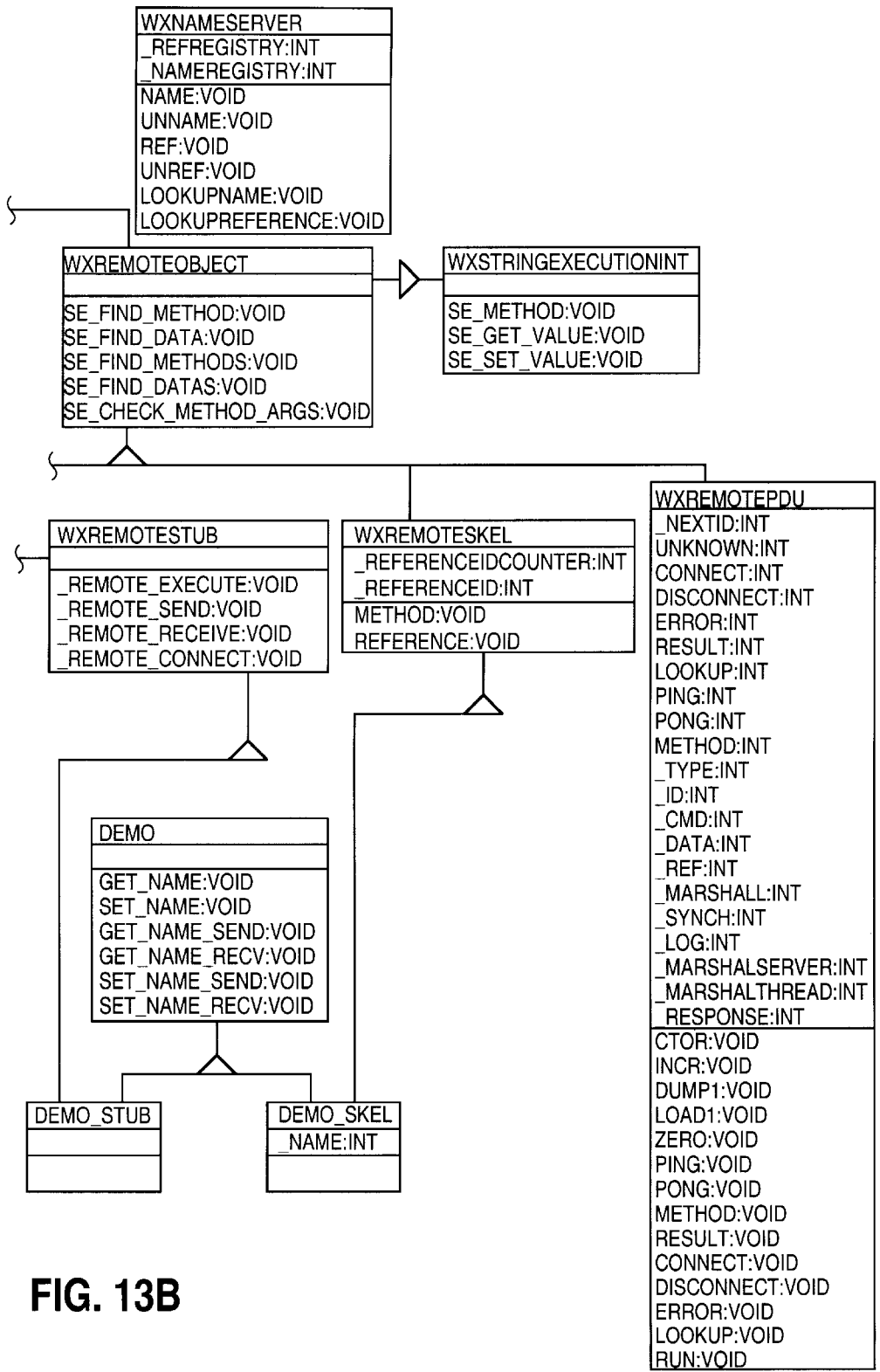

Referring to FIG. 13, this section describes in more detail the function and purpose of each class in the Object Router of the preferred embodiment of the present invention.

WxRemoteObjectInt

This is the interface that all remote objects must have. It contains several abstract class definitions, including WxStringExecutionInt, WxLock and WxFlags. Plus, it defines several methods used for all remote objects.

RWBoolean ol_isValid( ) const

This should be tested if the programmer does not know if this object is local or if the connection is established. This will return TRUE if the object is local or it has a connection to the remote object.

unsigned get_ol_referenceCnt( ) const

This returns the number of pointers outstanding for this object. Typically, if garbage collection is enabled, this object will automatically be destroyed when the referenceCnt reaches zero.
WxReferenceId get_ol_referenceiD( ) const
This is the remote referenceId for this object. This WxReferenceId uniquely tags an object instance on the server for the established connection. This is not a well-known name in the sense that it is not guaranteed to be the same with a difference connection.
unsigned ol_reference( ) const
This increments the number of references outstanding. This needs to be performed whenever a new copy of the pointer is stored.
void ol_unreference( ) const
This decrements the reference count and should be called instead of delete.
Object* ol_object( ) const
This simply type casts this instance to an RWCollectable pointer.
WxRemoteStub* ol_stub( ) const
This will return a stub for this object. If this object is local, it will create a stub. If this is already a stub, it will increment the reference count.
WxRemoteSkel* ol_skel( ) const
This will return a skeleton for this object. If this is a skeleton, it simply increments the reference count. If this is a stub, it will create a new skeleton, copy the data and return it.
WxRemoteReference* ol_remoteReference( ) const
This will create a WxRemoteReference object which is only used for serialization.
  WxRemoteObject
  This is the actual first level implementation of the above interface and adds String Execution to the above functions. From this object, all of the Object Router objects are derived.
  WxRemoteReference
  This is a type of network "pointer" which indicates where the actual skeleton object resides. It contains the following data:
RWInetHost host
int port
RWClassID classID
WxReferenceId referenceId
  Port and host are used to uniquely specify the socket for the WxRemoteConnectionServer. The referenceId is used to uniquely specify which object on the WxRemoteConnectionServer this points to. The classID is simply used to construct a local stub object.
  WxRemoteStub
  All stubs are derived from this object and the abstract base object for the class. This object provides some interfaces to the Object Router library, which is used by the meta compiler.
WxRemotePDU* _ol_execute(WxRemotePDU* pdu) const
  This will block until ol execution is finished. It will take the pre-formatted PDU.
WxMarshalId_ol_send(WxRemotePDU* pdu) const
  This is a non-blocking remote execution, which returns a WxMarshalId, which can be used to receive the result.
WxRemotePDU*_ol_peek(WxMarshalId id) const
  This checks if the PDU id is returned from execution.
WxRemotePDU*_ol_receive(WxMarshalId id) const
  This blocks until the PDU is returned.
WxRemoteClient* _ol_connect( ) const This ensures the connection to other side is established.
  WxRemoteSkel
  All skeletons are derived off this object and the abstract base for the class. This object provides the interface ol_methodPDU( ) for the meta compiler to the Object Router.
  WxRemotePDU
  This is the actual data packet sent across the network. The data in this are:
WxMarshalId id
  This is the PDU packet number. This is a monotonically increasing integer to uniquely identify the packet.
unsigned flags
  Option flags to modify the execution of this protocol. The current options are:
Syn—this will perform synchronous execution of the packet at the server (no threads).
NoMarshal—this is a unconfirmed execution similar to UDP.
Log—this will (in the future) log this request
Response—this indicates that the PDU is a response
Val—this indicates that the result should be a value, not a reference.
unsigned type
  This is one of several known protocol operations:
Disconnect—close the connection between WxRemoteClient and WxRemoteServer
Error—an error occurred in processing the request
Result—a packet containing the result of a request
Lookup—a request to find a WxRemoteReference based on a well-known name in the WxRemoteNameServer
Ping—a request for the server to send a Pong back.
Pong—a response from the server to the client to a Ping
Method—a request to execute the command on the server
Unreference—a request to decrement a reference count.
Reference—a request to increment a reference count.
RWCString cmd
  This is the ASCII string command to execute on the remote server. This is the "name" in a Name-Value pair.
WxReferenceId referenceId
  This is the object WxReferenceId on the server to uniquely the object of this PDU.
Vector* data
  This is the data for a method execution. This is the "value" in a Name-Value pair.
  WxRemoteConnectionServer
  This is the main class on the server side of the Object Router. This is the entry point into the system for a WxRemoteClient requesting access. This is similar to a phone operator who directs incoming calls to the correct person. That person, in this analogy, is the WxRemoteServer.
  WxRemoteConnectionMonitor
  This is the main class on the client side of the Object Router. This is the entry point into the system for a connection and to create a WxRemoteClient for a particular destination. This is similar to a phone operator who directs outbound calls to the correct person. That person, in this analogy, is the WxRemoteConnectionServer.
  WxRemoteServer
  This is server side of the client-server communication channel that processes each inbound request. The WxRemoteServer will spawn a new thread for each WxRemotePDU method packet. There is always one WxRemoteServer for a WxRemoteClient.
  WxRemoteClient
  This is the client side of the client-server communication channel that sends each outbound request and rendezvous' with the inbound response. There is always one WxRemoteClient for a WxRemoteServer.

WxRemoteError

This is the class, which is thrown by both the client and server side whenever an error is detected. All of these are fatal and are non-recoverable.

WxRemoteException

This is the class, which is thrown by both the client and server side whenever an exception is detected. None of these are fatal and the user should provide recovery code.

Timing

Figure 14:
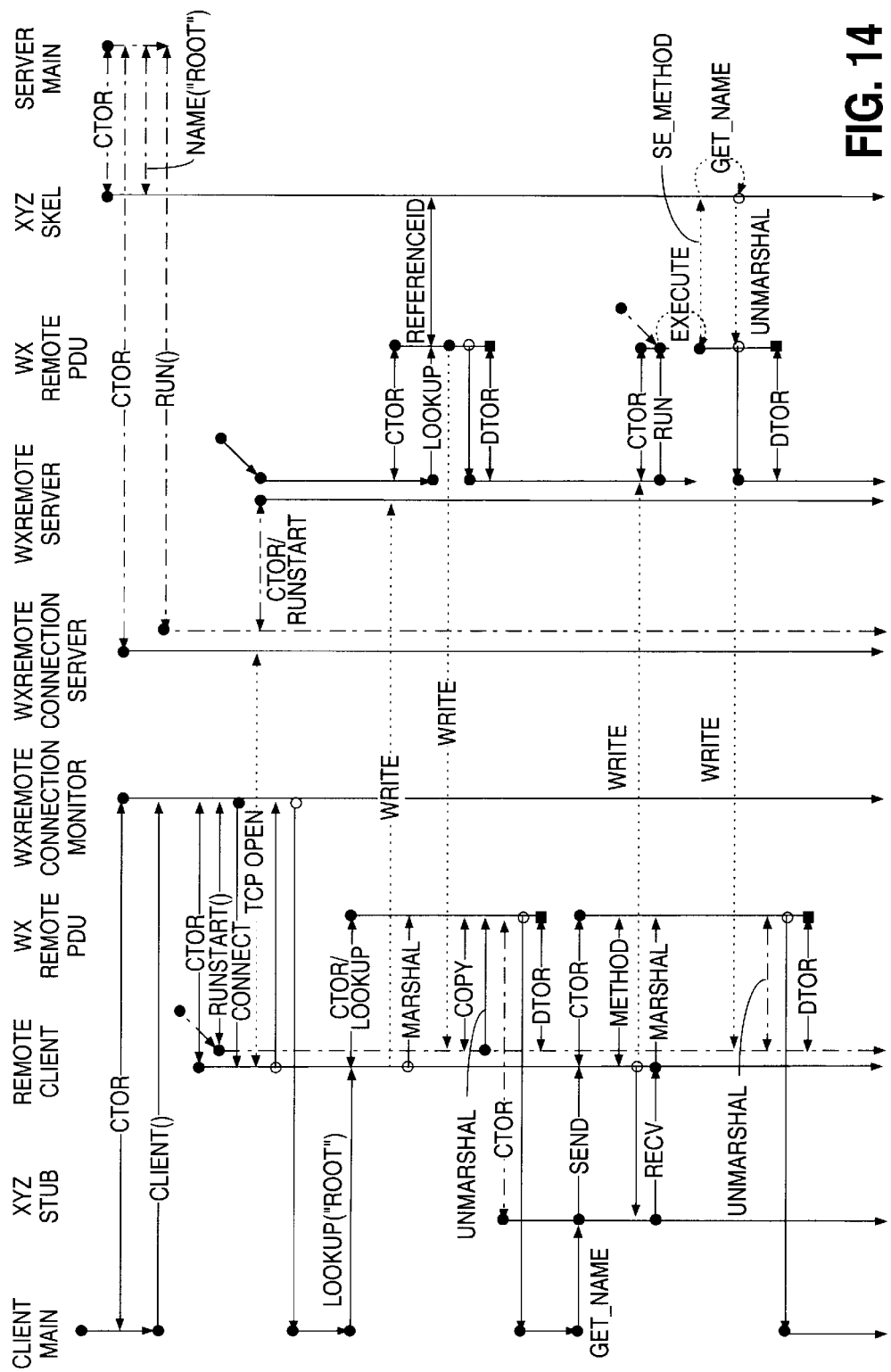
FIG. 14 illustrates an Object Router Timing diagram of the preferred embodiment.

Referring to the timing diagram illustrated in FIG. 14, the timing diagram shows the timing between all of the objects and the threads operating on them in the preferred embodiment. This timing diagram represents the startup of the object-layer on both the client and server sides. It also demonstrates a lookup("root") call from the client and a later getname( ) method call on the root object.

The vertical lines in FIG. 14 represent the objects (data and functions) used in the client and server sides. The horizontal lines represent the threads in the operating system—different threads have different line patterns. There are two threads shown on the client side (left) and there are three on the server side (right). Also, the dotted "write" line represents TCP traffic between the two machines (client and server).

System Requirements

In the preferred embodiment of the present invention, the following conventional computer components may be used to implement the present invention.

Hardware

Intel brand personal computer (PC), Unix workstation or Unix server, or network appliance or device on a DSP chipset.

Software

In the preferred embodiment, the software is compiled under Windows NT3.51 and 4.0 using the Microsoft Visual C++ compiler 2.1. This requires the wx.lib, and the Rogue Wave libraries: Tools++, Net++ and Threads++, Unix, WinNT server, or DSP chipset. It will be apparent to those of ordinary skill in the art that the system items defined above represent an implementation of the preferred embodiment. Other equivalent embodiments will be apparent to those of ordinary skill in the art.

DOLSIB Architecture Introduction

The present invention also includes a dynamic DOLSIB, the Distributed Online Service Information Base of the Object Router. The following sections cover an overview of the architecture for the DOLSIB, as the enterprise needs to be customized for each Merchant. To accomplish this, a uniform interface is provided which will allow the Merchant, to provide a, customized interface for the business or management objects using a simple Extended Finite State Machine (EFSM) or DOLSIB language. A library provides the core parser and interpreter for the DOLSIB. It also is the base class for business and management objects, which will interface with the enterprise interface.

1. Glossary

| Item | Definition |
|------|------------|
| EFSM | Extended Finite State Machine |
| EISM | Enterprise Interface State Machine |
| FSM | Finite State Machine |

-continued

1. Glossary

| Item | Definition |
|------|------------|
| DOLSIB | Distributed On-Line Service Information Base |
| state | The set of values describing the current position of the machine if it has memory. |
| transition | The action and state change performed by the machine after receiving an event |
| event | The inbound trigger which causes the machine to perform some transition |
| action | The output of the machine as a result of a transition |
| diagram | A complete finite state machine description containing states and transitions. |

2. Architectural Overview

The architecture of a business object in the preferred embodiment requires four parts:
1. The Extended Finite State Machine (EFSM) DOLSIB in the CoreBusinessObject or Management Object (C++)
2. The Object Router interface for the business or management object to the DOLSIB. (C++)
3. The enterprise interface protocol (specification)
4. The DOLSIB instructions for the business or management object (EISM)

The first item (DOLSIB and CoreBusinessObject or management object) is built once. This is part of the Object Router library. The second item is built as a common business object and should be generic enough to be configurable for different merchants. The third item is a specification that must be written by the merchant for his own enterprise interface. The fourth is configurable during runtime for different business or management objects.

The following sections discuss the DOLSIB and CoreBusinessObject or management object, as well as show an example BankAccount object which has two different merchant enterprise interfaces.

DOLSIB FSM

Figure 15:
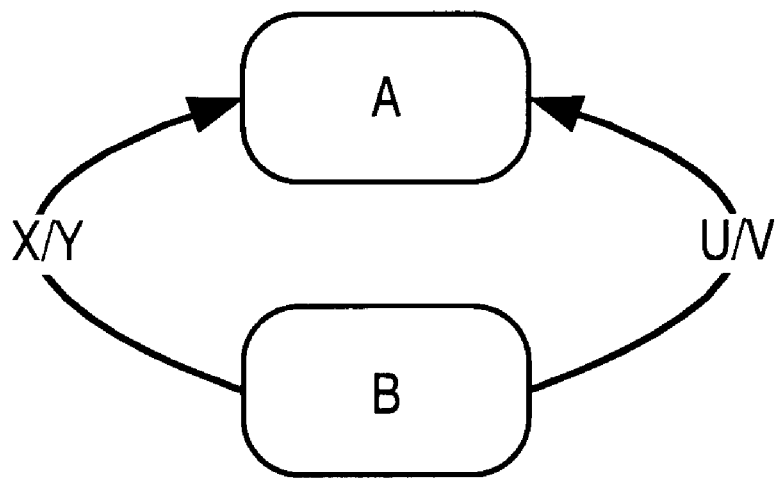
FIG. 15 illustrates a finite state machine.

As shown in FIG. 15, the simple Finite State Machine (FSM) consists of two items: a set of states S and their possible transitions T. A transition t consists of an initial state ts, and event e which triggers an action a, and a final state tf. The example illustrated in FIG. 15 consists of two states S={A, B} and two transitions T={t1, t2}. The transitions can be described as t1=(A, X, Y, B) and t2=( B, U, V, A ). The transition t1 from state A to state B is triggered by an event X and causes an action Y. Likewise, the transition t2 from state B to state A is triggered by an event U and causes an action V. If the finite state machine is in state A and receives any event besides X, it will remain in state A. Only when a valid event occurs (by having a defined transition) does the FSM change its state.

In a formal FSM, the set of states is indeed finite. However, often an extended FSM, called the dynamic DOLSIB, is needed. Here the states are not finite, per se; there exists a number of finite state "blocks" on the diagram, but there are also global variables which may store values which may take on an infinite number of possibilities. This adds another dimension to the FSM and makes the whole system have an infinite number of "states".

Figure 16:
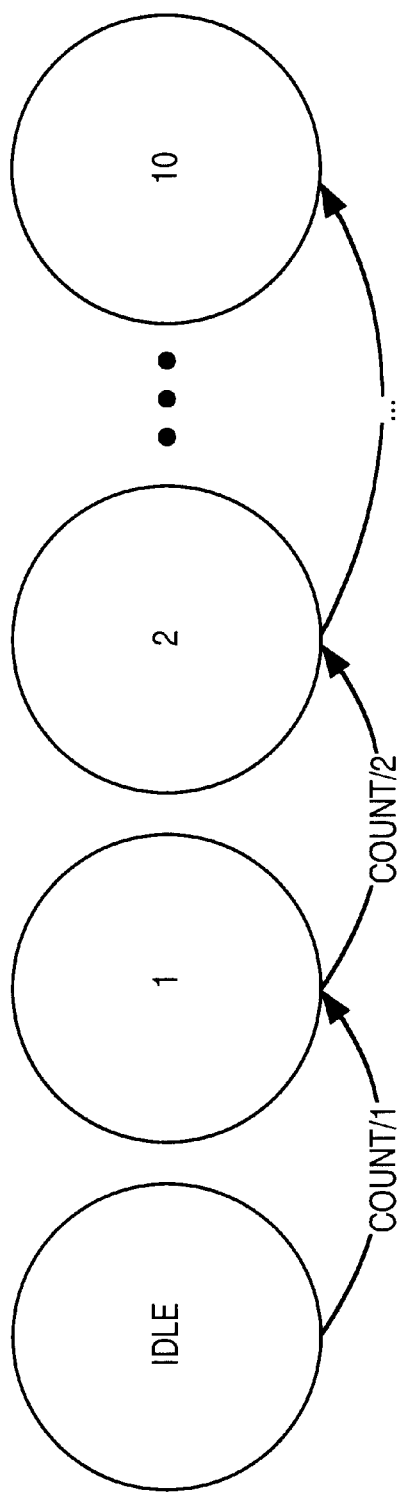
FIG. 16 illustrates a counter implemented with a finite state machine.

As an example, consider a simple counter that receives an input trigger and outputs an integer one greater than the previous output. The input event is anything. The output action is the integer "count". In the formal FSM, there would need to be a state for each possible integer value. If the counter had a limit of 10, then there would be eleven states:

an initial state and one for each output value (see FIG. 16). However, if an infinite counter were needed, an infinite number of states would be needed.

Figure 17:
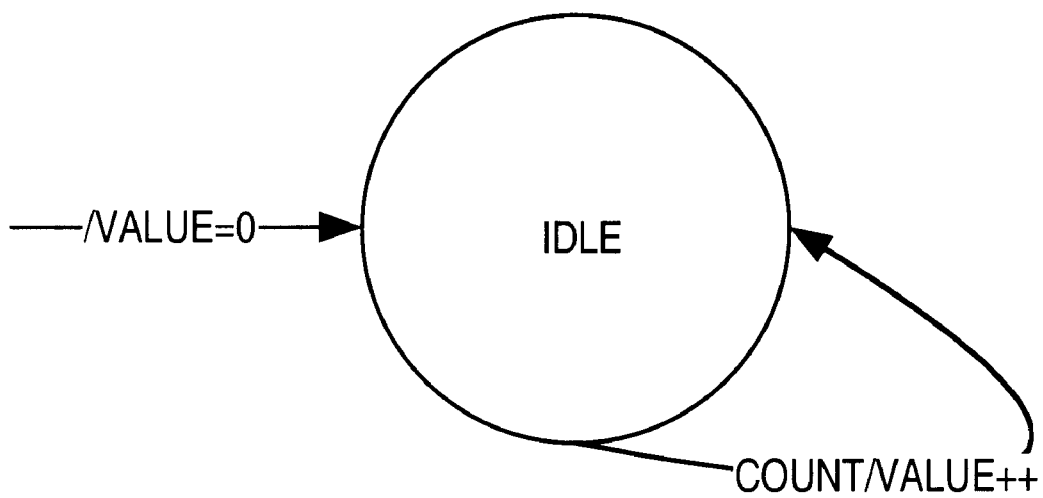
FIG. 17 illustrates a counter implemented with the present invention.

However, if an extended FSM or DOLSIB is used, there would only need to be one state. This is the idle (or initial) state. The counter would simply output the count value and increment this value (see FIG. 17).

The following section describes the architecture of a DOLSIB C-like language and its use in the present invention. For example, the above counter would be written in the DOLSIB language, as shown below:

```
state Idle;
event count;
var value=0;
var str="";
diagram Counter;
Counter (Idle) {
    Idle : count ? value++ -> Idle;
}
```

This allows the user of the DOLSIB to simply describe the events and actions of the machine in an easy to write and read language. The above describes the Counter diagram beginning in the Idle state. If the Counter is in the Idle state (which it always is), then given the count event, it will increment the variable value and output this as an action. The arrow "→" signifies that the new state is to be Idle.

Language

The Enterprise Interface State Machine (EISM).DOLSIB language of the preferred embodiment is a C-style DOLSIB EFSM language similar to ISO's Estelle. The major difference between the two is the language on which they are based. DOLSIB EISM is based on C style conventions, while Estelle is a Pascal language extension.

The language of the DOLSIB EISM has several features listed below.

ESTELLE-like

The ISO Estelle language is defined as a superset of the Pascal language and fits nicely with the language. The DOLSIB EISM language is similar in that it conforms to the syntax of C.

Multiple Diagram

The DOLSIB EISM language provides for more than one state machine diagram (and thus, more than one state machine) to be described and operated by the same script.

Interpreted

The state machine is interpreted allowing for bytecode compilation into a stack machine opcode.

Stack-based machine

The stack machine allows for a simple implementation and compilation of the parsed state machines. This also allows for other languages in the future.

C style language

The C-style language is easy for the vast majority of programmers. But as mentioned above, if this is not useful, another interface may be designed on the stack machine.

Simple ASCII language

The programming language includes a simple ASCII English language equivalent of the C-style convention.

Machine

Figure 18:
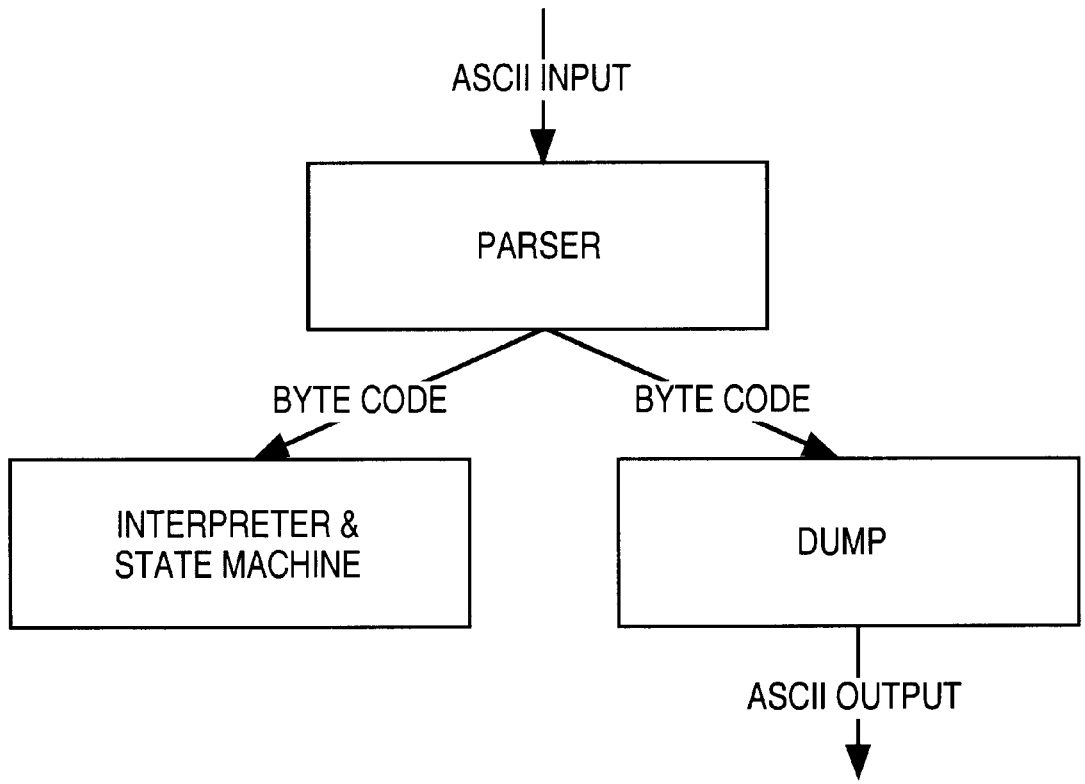
FIG. 18 illustrates a sample state machine with files and programs.

Referring to FIG. 18, the state machine described in the preferred embodiment uses the scheme shown in FIG. 18 to create an intermediate bytecode, which is interpreted by the stack machine. As shown in FIG. 18, the ASCII input file is written in the DOLSIB EISM language and passed off to the parser which converts this to the byte code. The byte code can then be used to run the stack machine (as a state machine) or to the dump program which creates an object file dump of the instructions and the symbol table.

Parser

The parser will take the input ASCII, parse it for syntax and syntactical errors, and then create a stack machine instruction set for the resulting state machine. The conversion of the state machine diagram into a stack machine saves time for the run time interpreter and does the preprocessing of the symbol table.

Interpreter

The interpreter is now just a simple stack machine, which does receive input events and sends out actions. The stack machine contains a very limited set of instructions, which simply perform the basic arithmetic and conditional chores at run time.

Dump

The dump program is the only debugging tool, which simply prints out the symbol table and the instructions for each stack op code.

Symbols

Symbol names may be any alphanumeric string ([A-Za-z_][A-Za-z_0-9]*) which does not match a keyword. Symbols are always case sensitive.

All symbols must be declared before use and before the first diagram body. Symbols of the same type may be declared within the same command. Any symbols may be a scalar or vector. The length of the vector must be declared with the symbol type. Valid declarations would be:

state xyz[4];
event test;
var x=0,y=1,z=4;
var a="apple",b="banana";

However, the following are not valid symbols:
V/21 contains an illegal symbol "/"
diagram this is a keyword There are five types of symbols: diagram, action, event, state, var. All symbols have a value when evaluated, and all have a particular function used as an input to the DOLSIB EISM. The following table shows their respective evalutions:

TABLE 1

Evaluation of Symbol types

| Type | Evaluates to |
| --- | --- |
| diagram | current state id |
| action | value of the action; default is zero |
| event | value of the event if current event; zero otherwise |
| state | non-zero if this is the current state. |
| var | an integer or string variable |

The next table shows their action when entered into the DOLSIB EISM. This is quite different from their action within a program. Every symbol type, which enters the DOLSIB EISM also carries an assignment value which it uses in the following way:

TABLE 2

Assignment of Symbol Types

| Type | Assignment Action |
| --- | --- |
| diagram | changes the current state of this diagram to the assigned state |
| action | sets the action value |
| event | sets the event value |
| state | ignored |
| var | sets the variable |

The above assignments within the DOLSIB EISM program are valid with the exception of state. This is because the state is a read-only condition of the current system and cannot be modified. If the programmer wants to change the state of the diagram within DOLSIB EISM, one may use the diagram assignment.

For each declared symbol, there exists an integer ID. The integer ID begin with zero (for the variable "nil"). This variable is always declared and may be used as an event, which does nothing but trigger transitions. All other symbols are assigned starting with one in the order in which they are declared in the program. Hence, if one changes the order, the symbol Ids will change. Also, an integer is assigned to each element of a vector. The previous example would have Ids as:

TABLE 3

Symbol Table

| Name | Type | ID |
| --- | --- | --- |
| nil | int | 0 |
| xyz[0] | state | 1 |
| xyz[1] | state | 2 |
| xyz[2] | state | 3 |
| xyz[3] | state | 4 |
| test | event | 5 |
| x | var | 6 |
| y | var | 7 |
| z | var | 8 |
| a | var | 9 |
| b | var | 10 |

Statements

This section outlines a typical program and the possible statements in DOLSIB EISM. Every program must have all of its symbols declared as one of the five types followed by at least one diagram.

Consider as an example the simple state diagram that counts the number of incoming count events and dumps the count upon receiving the event dump. This state diagram could be written in DOLSIB EISM as:

```
state Idle;
event count,dump;
var n=0;
diagram Counter;
Counter (Idle) {
    Idle : count ? n++      -> Idle
         | dump ? n(), n=0 -> Idle;
}
```

Notice that all of the symbols are declared. The state diagram is named Counter and the line Counter (Idle) { begins the diagram definition. The state Idle is placed in parentheses to show that it is the initial state. If no state is declared as the default, the first state in the state diagram is considered the default.

The state transition may be described in many different formats. The one shown above would have the following meaning:
If in state Idle
and event count is seen, then increment n and go back to state Idle
else if event dump is seen, then output n and n to zero, then go back to state Idle.

This state transition may also be written in DOLSIB EISM as:
if Idle and count then n++ enter Idle
else dump then no, n=( ), m=0 enter Idle;

This form is more understandable initially and may be preferred. In either case, the keyword "if" is optional and the following table shows which keywords and symbols are interchangable.

TABLE 4

Interchangable Symbols

| Symbol | Meaning |
| --- | --- |
| : with and | introduces first arc |
| ? then | follows arc conditional expression |
| ->begin enter | signifies which state to enter if conditional is true |
| \|else elsewith | introduces next arc |

A final variation on the command structure is the ability to specify outputs without the parentheses. The normal meaning of no would be to output an action which has an ID of n and a value equal to n. One could specify, for example, n(5) which would set the value of n to five and then output n. One may also explicitly output a symbol as:

Idle with dump then enter Idle output n;

instead of the first arc. Notice, however, that the proceeding two statements are interchangable.

BNF Grammar

The grammar is specified similar to BNF form. Brackets "[ ]" surround those items which are optional. A vertical bar is used to show alternatives. Bold symbols are actual keywords

| | |
| --- | --- |
| program | :decl diagrams |
| decls | :decl \| decls decl |
| decl | :type defs; |
| type | :diagram \| state \| event \| int \| action |
| defs | :def \| defs, def |
| def | :lvalue \| lvalue = const |
| diagrams | :diagram \| diagrams diagram |
| diagram | :diagram_init {lines} |
| diagram_init | :diagram_symbol (state_symbol) \| diagramsymbol |
| lines | :line \| lines line |
| line | :[if] states with cmds; |
| with | :with \| and \|: |
| states | :state_symbol \| states, state_symbol |
| cmds | :cmd \| cmds else cmd |
| else | :elsewith \| else \| \| |

-continued

| | |
|---|---|
| cmd | :exprs then acts begin state_symbol [output outs] |
| then | :then \| ? |
| acts | :act \| acts, act |
| act | :lvalue ([expr]) |
| | \| expr |
| begin | :begin \| enter \| -> |
| outs | :lvalue \| outs, lvalue |
| exprs | :const \| state_symbol \| & symbol \| lvalue \| asgn |
| | \| (expr) |
| | \| expr cmpop expr |
| | \| expr logop expr |
| | \| expr arthop expr |
| | \| NOT expr |
| | \| - expr |
| cmpop | :LT \| LE \| EQ \| NE \| GT \| GE |
| logop | :AND \| OR |
| arthop | :+\| - \| * \| / \| % \| .. |
| asgn | :lvalue ASSIGN expr |
| | \| lvalue ++ |
| | \| ++ lvalue |
| | \| lvalue -- |
| | \| -- lvalue |
| const | :".*" \| [0–9][0–9]* |
| lvalue | :symbol \| symbol [expr] |

Core Business Object or Management Object

All business or management objects must interface with the back-end channel to communicate with the enterprise computer. Hence, the core business or management object, off which all of the business or management objects derive, must have embedded in it the FSM to be able to parse the EISM DOLSIB configured with diagrams.

The core business or management object must be remotely accessible and therefore must be integrated within the Object Router. It has the interfaces for the enterprise interface and the FSM. FIG. 19 illustrates the description of an example of a CoreBusinessObject or Management Object.

Example Application (BankAccount)

The back end communication channel must be customized for each customer for their given application. Since this back end channel will be different for each customer, a program capable of handling the different capabilities and customizable features per customer is needed. As illustrated below, consider a simple bank account class, which has a balance query and withdraw and deposit methods to change the account balance:

```
class BankAccount {
    int balance() const;
    void withdraw(int amount);
    void deposit(int amount);
}
```

Figure 20:
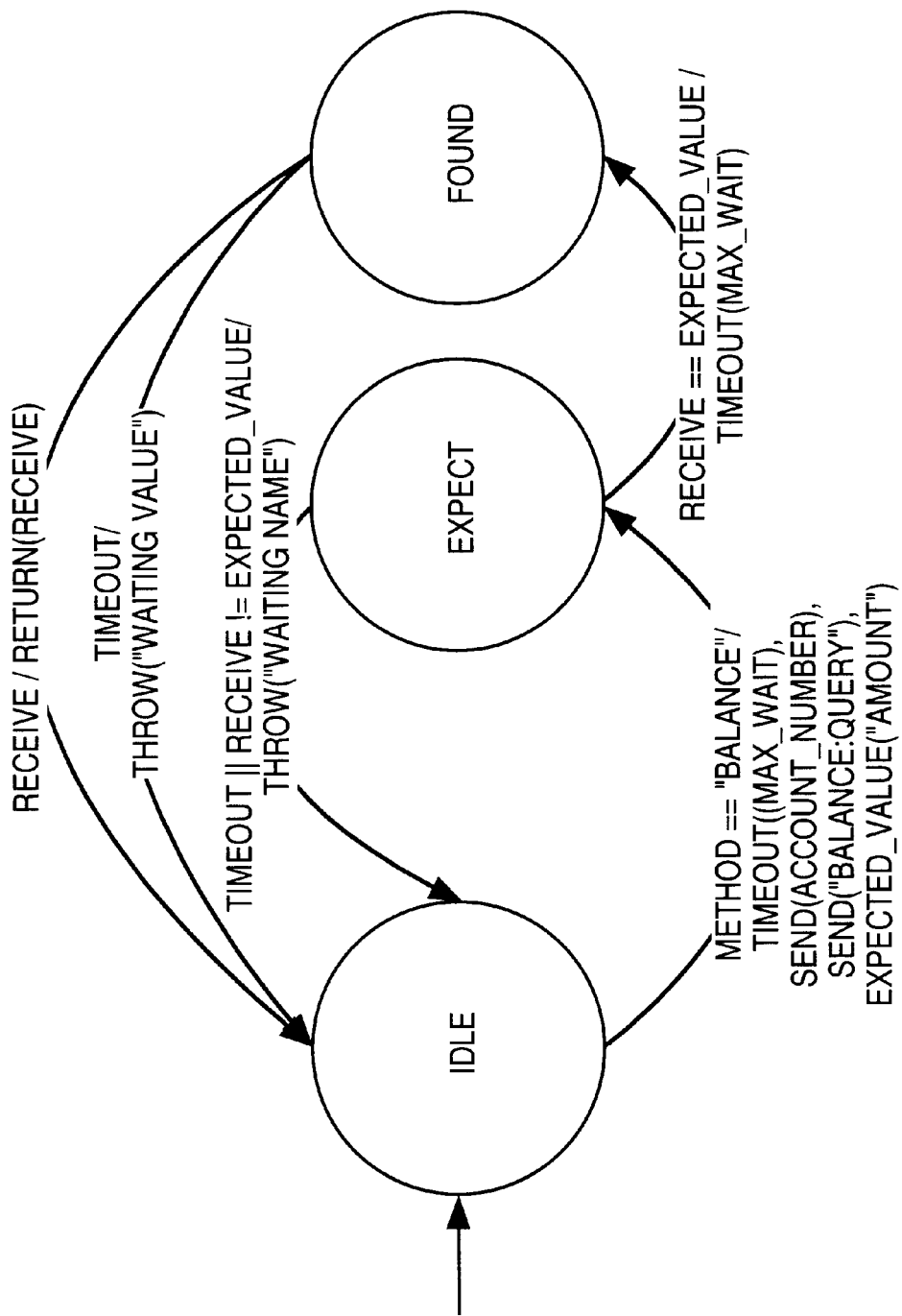
FIG. 20 illustrates an example of a Bank BI DOLSIB FSM Diagram for Balance.

Given this object, the programmer can query the account balance from within the object-oriented C++ environment. However, the actual mechanics of talking to the back end may vary from merchant to merchant. Therefore, an intermediate machine needs to connect with the back-end to communicate using a name-value pair protocol, which is modifiable. Consider two banks, B1 and B2. B1 may query the back-end for a balance of an account by sending the account number and then the word "balance:query". This can be summarized as follows:
1. send("account_number")
2. send(<eid>)
3. send("balance:query")
4. expect("amount")
5. expect(amount)
6. return amount The other bank B2 may require the account number being set, receiving this confirmation and then send the "balance" query. This can be summarized as follows:
1. send("account-number")
2. send(<account number>)
3. expect(status)
4. send("balance")
5. expect(amount)
6. return amount The second bank B2 contains more steps and can have more error conditions. As illustrated in FIG. 20, both of these cases can also be described using an FSM and therefore can be written using the DOLSIB EISM language to configure the BankAccount class.

The FSM diagram illustrated in FIG. 20 shows B1 being a little more complicated. This is due to the added error transitions. One can view the state diagram of FIG. 20 as an expect script for a modem which sends out requests and expects back responses matching a particular string. Using the DOLSIB EISM language, the diagram of FIG. 20 can be written as follows:

```
/* the following are automatically declared by DOLSIB interface:
    state Idle; // default initial state
    state Expect; // waiting on receive == expect_value
    state Found; // default state after receiving expect_value
    state Error; // default error state
    event receive; // indicates the enterprise interface has data
    event timeout; // indicates the timer has expired
    event method; // indicates a method call has started
    action return; // returns from the method call
    action send; // sends data to the enterprise interface
    action throw; // returns from the method call with a throw
    var max_wait=1000; // the default timer value
    var eid=0; // the enterprise id
    var expected_value=""; // waited value
*/
diagram Balance;
Balance(Idle) {
    Error : true ? -> Idle
    Idle
        : method == "balance" ?
            timeout(max_wait),
            send(eid),
            send("balance:query")
            expected_value = "amount"
            -> Expect;
    Expect
        : receive == expected_value ?
            timeout(max_wait)
            -> Found
        | receive != expected_value ?
            throw("expected" ..expected_value
            .."but received"
                ..receive)
            -> Error
        | timeout ?
            throw("timeout while waiting for" ..expected_value)
            -> Error;
    Found
        : receive ?
            return(receive)
            -> Idle
        | timeout ?
            throw("timeout while waiting value")
            -> Idle;
}
```

Figure 21:
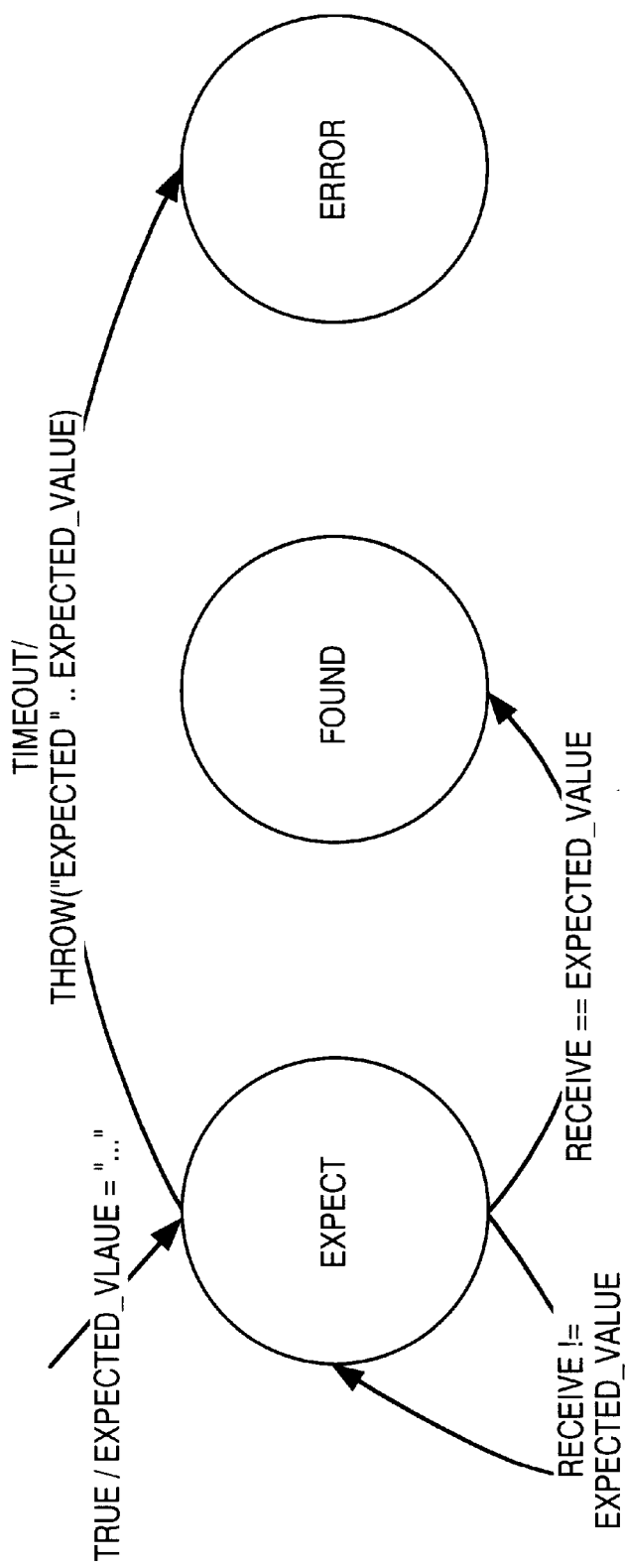
FIG. 21 illustrates a diagram for expect, found, and error states.

As shown in the above description, often the merchant will be expecting something from the enterprise interface. Instead of creating a new state for each such "expect" string, one can make use of a predefined set of states "Expect", "Found" and "Error". The only state transitions defined are for the "Expect" state. Referring to FIG. 21, the user must therefore provide the arcs for the Error and Found states.

The diagram illustrated in FIG. 21 shows the defined arcs of the Expect state. The program for this was the same as shown in the previous example for Bank B1:

```
Expect
    : receive == expected_value ?
        timeout(max_wait)
        -> Found
    | receive != expected_value ?
        throw("expected" .. expected_value
        .. "but received"
        .. receive)
        -> Error
    | timeout ?
        throw("timeout while waiting for" .. expected_value)
        -> Error;
```

For a single expected string, the use is straightforward. However, to use the expect state for more than one string (more than one expected response), one must make use of the "extended" nature of the DOLSIB EFSM. Namely, one must use global variables to store the other dimension of state. This is shown with the second Bank example using the variable "step".

Figure 22:
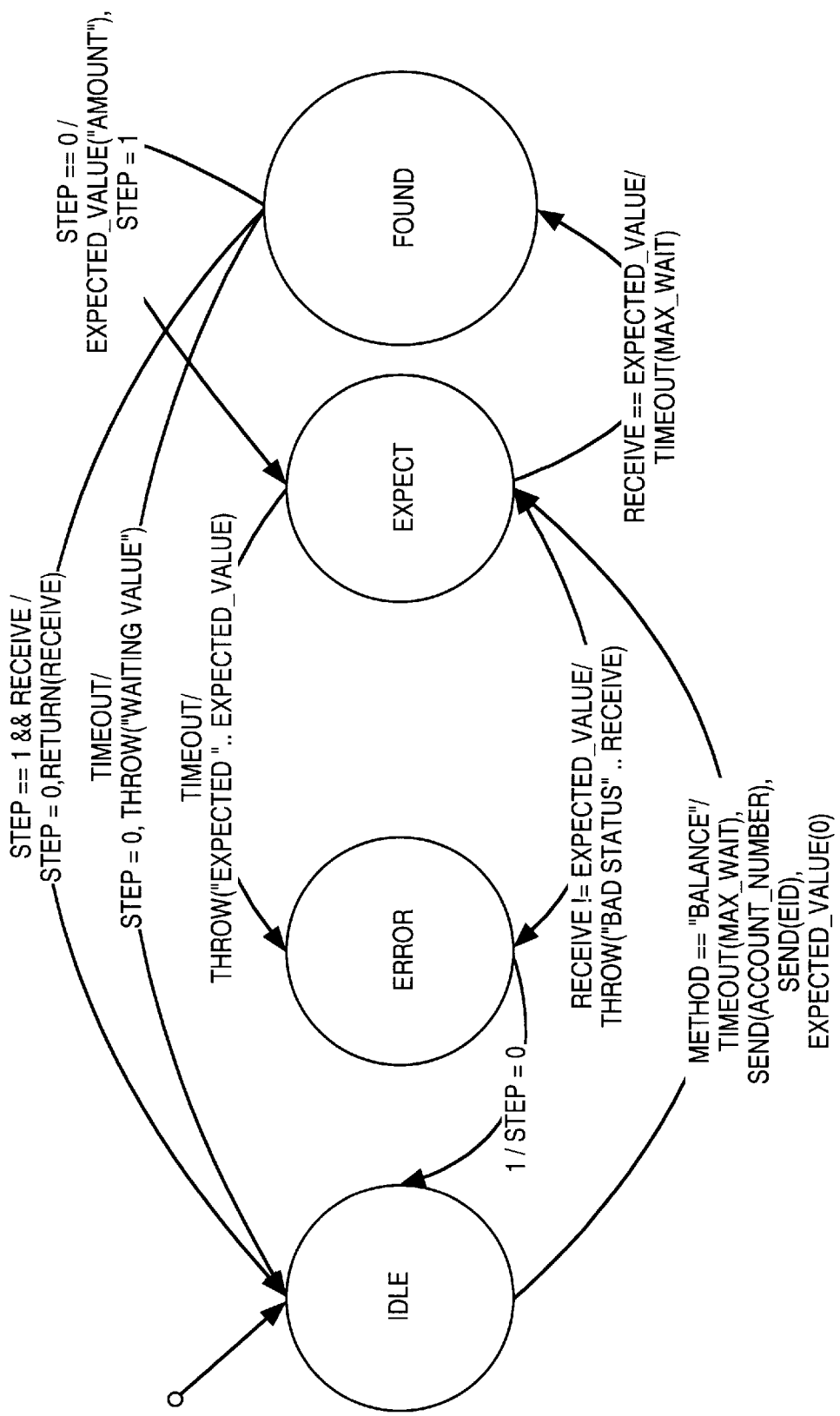
FIG. 22 illustrates an example of a Bank B2 DOLSIB FSM Diagram for Balance.

For the other bank (B2), the finite state diagram would be a little different as shown in FIG. 22. This diagram (see FIG. 22) is very similar, but does produce a different "name-value" pair protocol. This is described below in the DOLSIB EISM program:

```
diagram Balance;
// two steps:
// 1) wait for status.
// 2) wait for "balance".
var step = 1;
Balance(Idle) {
    Error : true ? step = 1 -> Idle;
    Idle
        : method == "balance"?
            timeout(max_wait),
            send("account_number")
            send(eid),
            expected_value = 0
            -> Expect;
    Found
        : step == 1 ?
            expected_value = "balance",
            step = 1
            -> Expect
        | step == 2 && receive ?
            return(receive),
            step = 1
            -> Idle
        | timeout?
            throw("timeout while waiting balance"),
            -> Error;
}
```

These two bank examples show how different merchant back-ends can make use of the same business or management object.

The bank object class structure was shown above. However, since this will be derived off of the CoreBusinessObject or Management Object (FIG. 19), it follows that this BankAccount object needs an Object Router definition too. This definition is shown below assuming these three methods: balance, withdraw and deposit:

```
beginclass BankAccount CoreBusinessObject
begindata
enddata
beginmethod
method const int balance
method      void deposit {int amount}
method      void withdraw {int amount}
endmethod
endclass
```

After compiling this Object Router object, one can then add the hooks to provide the method connections to the FSM for this particular business object.

```
int BankAccountSkel::balance() const {
    fsm_event("balance","");
    RWCString result = fsm_result();
    return atoi(result);
}
```

The balance method simply calls the FSM event "balance" which starts the diagram transition from Idle to Expect (see FIG. 20). Since all results in the FSM are performed using strings, the string return type must be converted to an integer.

```
void BankAccountSkel::withdraw(int amount) {
    char a[20];
    sprintf(a,"%d",amount);
    fsm_event("withdraw",a);
    fsm_result();
}
void BankAccountSkel::deposit(int amount) {
    char a[20];
    sprintf(a,"%d",amount);
    fsm_event("deposit",a);
    fsm_result();
}
```

These two examples show that the method fsm_result( ) is called even when not expecting a result. The reason for this is twofold: 1) the thread will block until result is actually called inside of the FSM and 2) an error result will throw an exception within this fsm_result.

Thus, a configurable value-added network switching and object routing method and apparatus is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A switch for enabling real-time transactions on a value-added network, comprising:

means for switching to a transactional application in response to a user specification from a network application;

means for transmitting a transaction request from the transactional application; and means for processing the transaction request, including performing object routing.

2. The switch as claimed in claim 1, wherein the means for switching further comprises:
   means for receiving the user specification;
   means for enabling a switch to the transactional application; and
   means for activating the transactional application.

3. The switch as claimed in claim 2, wherein means for activating the transactional application further includes means for creating a transaction link between the user application and the transactional application.

4. The switch as claimed in claim 1, wherein the means for processing the transaction request further comprises means for coupling the means for transmitting to a host containing data corresponding to the transaction.

5. The switch as claimed in claim 4, further including means for activating an agent to create a transaction link between the user application and the transactional application.

6. The switch as claimed in claim 1, further including a means for automated state management and service network control.

7. The switch as claimed in claim 1, further including a means for automating a transaction from beginning to end in real time.

8. The switch as claimed in claim 1, further including a means for keeping a transaction captive for aggregation of content associated with the transaction.

9. The switch as claimed in claim 1, further including a means for intelligently connecting a transaction for usage-based services.

10. The switch as claimed in claim 1, further including a means for connecting the subscriber to multiple content publishers backend network nodes.

11. The switch as claimed in claim 1, further including a means for dynamic virtual packaging.

12. The switch as claimed in claim 1, further including a means for creating a value-added service specific virtual private network of remote service partners.

13. A method for performing real-time transactions on a value-added network, comprising:
   providing a transactional application selection mechanism to allow a user to select a transactional application, wherein the transactional application selection mechanism is associated with a Web server and a Web page;
   receiving a request at the Web server in response to providing the transactional application selection mechanism, wherein the request is a request to use the transactional application to perform an interactive real-time transaction;
   switching to the transactional application in response to receiving the request, by instructing the Web server to hand over the request to the transactional application; and
   requesting transaction data from one or more other computer systems connected with the value-added network with the transactional application, wherein the transaction data allows the user to perform the interactive real-time transaction on the value-added network.

14. The method of claim 13, wherein switching includes using a routing switch within the application layer of the OSI model to perform application layer routing.

15. The method of claim 13, wherein switching further comprises:
   enabling a switch to the transactional application; and
   activating the transactional application.

16. The method of claim 15, wherein said activating the transactional application further includes creating a transaction link between a network application associated with the user and the transactional application.

17. The method of claim 13, wherein the one or more other computer systems connected with the value-added network includes a data repository, the method further including retrieving data from the data repository by multi-protocol object routing.

18. The method of claim 17, further including using the Web server to process the request for transaction data and retrieve data corresponding to the transaction from the data repository.

19. The method of claim 17, wherein the data repository is a data repository to store banking data, wherein retrieving data includes retrieving banking data to complete a banking transaction.

20. The method of claim 13, wherein the value-added network is a service specific virtual private network of remote service partners operating within an IP-based facilities network, wherein the service specific virtual private network is managed by using distributed control.

21. The method of claim 13, wherein the transactional application uses switching and object routing to execute the transaction.

22. The method of claim 13, further including using the transactional application to keep a transaction captive for aggregation of content associated with the transaction.

23. The method of claim 13, further including using multi-protocol object routing and a security mechanism to perform the transaction.

24. The method of claim 13, further including executing the transaction in a distributed computing environment, including creating a plurality of skeleton objects on a computer system remote to the user, registering the plurality of skeleton objects in a name server associated with the remote computer system, and transferring one or more stub objects to a computer system local to the user, wherein the one or more stub objects are derived from the plurality of skeleton objects.

25. The method of claim 13 further including executing the transaction by using a Distributed Online Service Information Base.

26. A machine-readable medium having stored thereon data representing sequences of instructions, for performing real-time transactions on a value-added network, which when executed cause a machine to:
   provide a transactional application selection mechanism to allow a user to select a transactional application, wherein the transactional application selection mechanism is associated with a Web server and a Web page;
   receive a request at the Web server in response to providing the transactional application selection mechanism, wherein the request is a request to use the transactional application to perform an interactive real-time transaction;
   switch to the transactional application in response to receiving the request, by instructing the Web server to hand over the request to the transactional application; and
   request transaction data from one or more other computer systems connected with the value-added network with the transactional application, wherein the transaction data allows the user to perform the interactive real-time transaction on the value-added network.

27. The machine-readable medium of claim 26, wherein the instructions for switching further comprise instructions causing the machine to:

enable a switch to the transactional application; and activate the transactional application, including creating a transaction link between a network application associated with the user and the transactional application.

28. The machine-readable medium of claim 27, wherein the instructions to switch further include instructions causing the machine to use a routing switch within the application layer of the OSI model to perform application layer routing.

29. The machine-readable medium of claim 26, wherein the one or more other computer systems connected with the value-added network includes a data repository, and wherein the instructions further include instructions causing the machine to retrieve data from the data repository by multi-protocol object routing.

30. The machine-readable medium of claim 26, wherein the instructions further comprise instructions causing the machine to execute the transaction in a distributed computing environment, including instructions to create a plurality of skeleton objects on a computer system remote to the user, register the plurality of skeleton objects in a name server associated with the remote computer system, and transfer one or more stub objects to a computer system local to the user, wherein the one or more stub objects are derived from the plurality of skeleton objects.

\* \* \* \* \*